United States Patent
Wang et al.

(10) Patent No.: US 11,698,929 B2
(45) Date of Patent: Jul. 11, 2023

(54) OFFLOAD OF DATA LOOKUP OPERATIONS

(71) Applicant: Intel Corporation, Santa Clara, CA (US)

(72) Inventors: Ren Wang, Portland, OR (US); Andrew J. Herdrich, Hillsboro, OR (US); Tsung-Yuan C. Tai, Portland, OR (US); Yipeng Wang, Portland, OR (US); Raghu Kondapalli, San Jose, CA (US); Alexander Bachmutsky, Sunnyvale, CA (US); Yifan Yuan, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1069 days.

(21) Appl. No.: 16/207,065

(22) Filed: Nov. 30, 2018

(65) Prior Publication Data
US 2019/0102346 A1    Apr. 4, 2019

(51) Int. Cl.
*G06F 7/00*       (2006.01)
*G06F 16/901*  (2019.01)
*G06F 16/903*  (2019.01)
*G06F 16/906*  (2019.01)

(52) U.S. Cl.
CPC ........ *G06F 16/9017* (2019.01); *G06F 16/906* (2019.01); *G06F 16/90335* (2019.01)

(58) Field of Classification Search
CPC .............. G06F 16/9017; G06F 16/906; G06F 16/90335; G06F 16/9024; G06F 16/8358; G06F 16/3344; G06F 16/325; G06F 16/2255; G06F 12/06; G06F 12/1018
See application file for complete search history.

(56) References Cited

U.S. PATENT DOCUMENTS 10,009,293 B1 *  6/2018  Mukherjee .............. H04L 45/74
10,296,459 B1     5/2019  Jayasimha et al.
11,023,453 B2 *  6/2021  Kimura ............... G06F 12/0238
(Continued)

OTHER PUBLICATIONS

Yandong Mao, Eddie Kohler, and Robert Tappan Morris. Cache craftiness for fast multicore key-value storage. In Proceedings of the 7th European Conference on Computer Systems (EuroSys'12), Bern, Switzerland, Apr. 2012.
(Continued)

*Primary Examiner* — Mohammad A Sana
(74) *Attorney, Agent, or Firm* — Compass IP Law PC

(57) ABSTRACT

A central processing unit can offload table lookup or tree traversal to an offload engine. The offload engine can provide hardware accelerated operations such as instruction queueing, bit masking, hashing functions, data comparisons, a results queue, and a progress tracking. The offload engine can be associated with a last level cache. In the case of a hash table lookup, the offload engine can apply a hashing function to a key to generate a signature, apply a comparator to compare signatures against the generated signature, retrieve a key associated with the signature, and apply the comparator to compare the key against the retrieved key. Accordingly, a data pointer associated with the key can be provided in the result queue. Acceleration of operations in tree traversal and tuple search can also occur.

15 Claims, 11 Drawing Sheets

(56) References Cited

U.S. PATENT DOCUMENTS

| | | | | |
|---|---|---|---|---|
| 2006/0109962 | A1* | 5/2006 | Schmidt | H04M 15/00 379/114.01 |
| 2010/0306222 | A1* | 12/2010 | Freedman | G06F 16/9014 707/769 |
| 2014/0317087 | A1* | 10/2014 | Collins | G06F 16/2455 707/715 |
| 2015/0213016 | A1* | 7/2015 | Kim | G06F 16/2255 707/747 |
| 2018/0218023 | A1* | 8/2018 | Fanghaenel | G06F 16/2343 |
| 2019/0004810 | A1 | 1/2019 | Jayasimha et al. | |
| 2019/0205139 | A1 | 7/2019 | Hughes et al. | |

OTHER PUBLICATIONS

Microsoft. Overview of single root i/o virtualization.https://docs.microsoft.com/en-us/windows-hardware/drivers/network/overview-of-single-root-i-o-virtualization-sr-iov-.

Naveen Muralimanohar, Rajeev Balasubramonian, and Norman P Jouppi. Cacti 6.0: A tool to model large caches. HP laboratories, 2009.

Balazs Nemeth, Xavier Simonart, Neal Oliver, and Wim Lamotte. The limits of architectural abstraction in network unction virtualization. In Proceedings of the 2015 IFIP/IEEE International Symposium on Integrated Network Managemen, Ottawa, Canada, May 2015.

Rolf Neugebauer, Gianni Antichi, José Fernando Zazo, Yury Audzevich, Sergio López-Buedo, and Andrew W Moore. Understanding pcie performance for end host networking. In Proceedings of the 2018 ACM SIG-COMM Conference (SIGCOMM'18), Budapest, Hungary, Aug. 2018.

Rasmus Pagh and Flemming Friche Rodler. Cuckoo hashing. Journal of Algorithms, 51(2), 2004.

Kostas Pagiamtzis and Ali Sheikholeslami. Content-addressable memory (cam) circuits and architectures: A tutorial and survey. IEEE lournal of Solid-State Circuits, 41(3), 2006.

Ben Pfaff, Justin Pettit, Teemu Koponen, Ethan J Jackson, Andy Zhou, Jamo Rajahalme, Jesse Gross, Alex Wang, Joe Stringer, Pravin Shelar, Keith Amidon, and Martin Casado. The design and implementation of open vswitch. In Proceedings of the 12th USENIX Symposium on Networked Systems Design and Implementation (NSDI'15), Okaland, CA, May 2015.

Ashok Sunder Rajan, Sameh Gobriel, Christian Maciocco, Kan-nan Babu Ramia, Sachin Kapury, Ajaypal Singhy, Jeffrey Ermanz, Vijay Gopalakrishnanz, and Rittwik Janaz. Understanding the bottlenecks in virtualizing cellular core network functions. In Proceedings of the 21st IEEE International Workshop on Local and Metropolitan Area Networks, Beijing, China, Apr. 2015.

L Rizzo and G Lettieri. Vale, a switched ethernet for virtual machines. In Proceedings of the 8th ACM Conference on Emerging Networking Experiments and Technologies (CoNEXT'12), 2012.

Luigi Rizzo. Netmap: a novel framework for fast packet i/o. In Proceedings of the 21st USENIX Security Symposium (USENIX Security'12), Bellevue, WA, Aug. 2012.

Martin Roesch. Snort: Lightweight intrusion detection for networks. In Proceedings of the 13th Systems Administration Conference (LISA'99), Seattle, WA, Nov. 1999.

Devavrat Shah and Pankaj Gupta. Fast incremental updates on ternary-cams for routing lookups and packet classification. In Proceedings of Hot Interconnects, San Francisco, CA, Aug. 2000.

Sumeet Singh, Florin Baboescu, George Varghese, and Jia Wang. Packet classification using multidimensional cutting. In Proceedings of the 2003 ACM SIGCOMM Conference (SIGCOMM'03), Karlsruhe, Germany, Aug. 2003.

Venkatachary Srinivasan, Subhash Suri, and George Varghese. Packet classification using tuple space search. In Proceedings of the 1999 ACM SIGCOMM Conference (SIGCOMM'99), Cambridge, MA, Aug. 1999.

Sue Marek. Update: AT&Ts Stephens: More than 40% of network functions are virtualized. https://www.sdxcentral.com/articles/news/atts-stephens-47-network-functions-virtualized/ 2017/07/.

Lin Tan and Timothy Sherwood. A high throughput string matching architecture for intrusion detection and prevention. ACM SIGARCH Computer Architecture News, 33(2), 2005.

Janet Tseng, Ren Wang, James Tsai, Saikrishna Edupuganti, Alexander W Min, Shinae Woo, Stephen Junkins, and Tsung-Yuan Charlie Tai. Exploiting integrated gpus for network packet processing workloads. In Proceedings of the 2nd IEEE Conference on Network Softwareization (NetSoft'16), Seoul, South Korea, Jun. 2016.

tungsten.io. tungsten fabric: multicloud multistack sdn. https://tungsten.io.

Zahid Ullah, Kim Ilgon, and Sanghyeon Baeg. Hybrid partitioned sram-based ternary content addressable memory. IEEE Transactions on Circuits and Systems I: Regular Papers, 59(12), 2012.

Zahid Ullah, Manish K Jaiswal, and Ray CC Cheung. Z-tcam: an sram-based architecture for team. IEEE Transactions on Very Large Scale Integration (VLSI) Systems, 23(2), 2015.

Zahid Ullah, Manish Kumar Jaiswal, YC Chan, and Ray CC Cheung. FPGA implementation of sram-based ternary content addressable memory. In Proceedings of 26th International Parallel and Distributed Processing Symposium Workshops & PhD Forum (IPDPSW'12), Shanghai, China, May 2012.

Balajee Vamanan, Gwendolyn Voskuilen, and TN Vijaykumar. Efficuts: optimizing packet classification for memory and throughput. In Proceedings of the 2010 ACM SIGCOMM Conference (SIGCOMM'10), 2010.

Kyu-Young Whang, Brad T Vander-Zanden, and Howard M Taylor. A linear-time probabilistic counting algorithm for database applications. ACM Transactions on Database Systems (TODS), 15(2), 1990.

Fang Yu, Randy H Katz, and Tirunellai V Lakshman. Gigabit rate packet pattern-matching using TCAM. In Proceedings of the 12th IEEE International Conference on Network Protocols (ICNP'04), Berlin, Germany, Oct. 2004.

Huanchen Zhang, Hyeontaek Lim, Viktor Leis, David G Andersen, Michael Kaminsky, Kimberly Keeton, and Andrew Pavlo. Surf: practical range query filtering with fast succinct tries. In Proceedings of the 44th SIGMOD International Conference on Management of Data (SIGMOD'18), Houston, TX, Jun. 2018.

Dong Zhou, Bin Fan, Hyeontaek Lim, Michael Kaminsky, and David G Andersen. Scalable, high performance ethernet forwarding with cuckooswitch. In Proceedings of the 9th ACM Conference on Emerging Networking Experiments and Technologies (CoNEXT'13), Santa Barbara, CA, Dec. 2013.

David Mulnix. Intel Xeon Processor Scalable Family Technical Overview. Jul. 10, 2017.

Shaizeen Aga, Supreet Jeloka, Arun Subramaniyan, Satish Narayanasamy, David Blaauw, and Reetuparna Das. Compute caches. In Proceedings of the 23rd IEEE Symposium on High Performance Computer Architecture (HPCA'17), Austin, TX, Feb. 2017.

Banit Agrawal and Timothy Sherwood. Ternary cam power and delay model: Extensions and uses. IEEE Transactions on Very Large Scale Integration (VLSI) Systems, 16(5), 2008.

Barefoot Networks. Barefoot tofino. https://www.barefootnetworks.com/products/brief-tofino/.

Anindya Basu, Girija J Narlikar, and Francis X Zane. Method and apparatus for performing network routing with use of power efficient team-based forwarding engine architectures. U.S. Pat. No. 7,356,033.

Muli Ben-Yehuda, Jimi Xenidis, Michal Ostrowski, Karl Rister, Alexis Bruemmer, and Leendert Van Doom. The price of safety: Evaluating iommu performance. In The Ottawa Linux Symposium, 2007.

Nathan Binkert, Bradford Beckmann, Gabriel Black, Steven K Rein-hardt, Ali Saidi, Arkaprava Basu, Joel-Hestness, Derek R Hower, Tushar Krishna, Somayeh Sardashti, Rathijit Sen, Korey Sewell, Muhmmad Shoaib, Nilay Vaish, Mark D. Hill, and David A. Wood. The gem5 simulator. ACM SIGARCH Computer Architecture News, 39(2), 2011.

(56) References Cited

OTHER PUBLICATIONS

Pat Bosshart, Glen Gibb, Hun-Seok Kim, George Varghese, Nick McKeown, Martin Izzard, Fernando Mujica, and Mark Horowitz. Forwarding metamorphosis: Fast programmable match-action processing in hardware for sdn. In Proceedings of the 2013 ACM SIGCOMM Conference (SIGCOMM'13), Hong Kong, China, Aug. 2013.
Adrian M Caulfield, Eric S Chung, Andrew Putnam, Hari Angepat, Jeremy Fowers, Michael Haselman, Stephen Heil, Matt Humphrey, Puneet Kaur, Joo-Young Kim, Daniel Lo, Todd Massengill, Kalin Ovtcharov, Michael Papamichael, Lisa Woods, Sitaram Lanka, Derek Chiou, and Doug Burger. A cloud-scale acceleration architecture. In Proceedings of the 49th IEEE/ACM International Symposium on Microarchitecture (MICRO'16), Taipei, Taiwan, Oct. 2016.
Zeshan Chishti, Michael D Powell, and TN Vijaykumar. Distance associativity for high-performance energy-efficient non-uniform cache architectures. In Proceedings of the 36th IEEE/ACM International Symposium on Microarchitecture (MICRO'03), San Diego, CA, Dec. 2003.
Douglas Comer. Ubiquitous b-tree. ACM Computing Surveys (CSUR), 11(2), 1979.
Intel Corporation. Data Plane Development Kit. https://www.dpdk.org.
Intel Corporation. Intel ethernet converged network adapter xl710 10/40 gbe.https://www.intel.com/content/www/us/en/ethernet-products/converged-network-adapters/ethernet-xl710-brief.html.
John Criswell, Nicolas Geoffray, and Vikram S Adve. Memory safety for low-level software/hardware interactions. In Proceedings of the 18th USENIX Security Symposium (USENIX Security'09), Montreal, Canada, Aug. 2009.
Thomas Dietz, Roberto Bifulco, Filipe Manco, Joao Martins, Hans-Joerg Kolbe, and Felipe Huici. Enhancing the bras through virtualization. In Proceedings of the 1st IEEE Conference on Network Softwarization (NetSoft'15), London, UK, Apr. 2015.
Yaozu Dong, Xiaowei Yang, Jianhui Li, Guangdeng Liao, Kun Tian, and Haibing Guan. High performance network Virtualization with sr-iov. Journal of Parallel and Distributed Computing, 72(11), 2012.
Dormando. memcached—a distributed memory object caching system, https://memcached.org/.
Marianne Durand and Philippe Flajolet. Loglog counting of large cardinalities. In European Symposium on Algorithms (ESA), 2003.
Bin Fan, David G Andersen, and Michael Kaminsky. Memc3: Compact and concurrent memcache with dumber caching and smarter hashing. In Proceedings of the 10th USENIX Symposium on Networked Systems Design and Implementation (NSDI'10), Lombard, IL, Apr. 2013.
FD.io. Vpp (vector packet processing), https://fd.io.
Daniel Firestone. Vfp: A virtual switch platform for host sdn in the public cloud. In Proceedings of the 14th USENIX Symposium on Networked Systems Design and Implementation (NSDI'17), Boston, MA, Apr. 2017.
Firestone, Daniel et al., "Azure Accelerated Networking: SmartNICs in the public cloud", In Proceedings of the 15th USENIX Symposium on Networked Systems Design and Implementation (NSDI'18), Renton, WA, Apr. 2018, 15 pages.
Frédéric Giroire. Order statistics and estimating cardinalities of massive data sets. Discrete Applied Mathematics, 157(2), 2009.
Younghwan Go, Muhammad Asim Jamshed, YoungGyoun Moon, Changho Hwang, and KyoungSoo Park. Apunet: Revitalizing gpu as packet processing accelerator. In Proceedings of the 14th USENIX Symposium on Networked Systems Design and Implementation (NSDI'17), Boston, MA, Apr. 2017.
Abel Gordon, Nadav Amit, Nadav Har'El, Muli Ben-Yehuda, Alex Landau, Assaf Schuster, and Dan Tsafrir. Eli: bare-metal performance for i/o virtualization. In Proceedings of the 17th International Conference on Architectural Support for Programming Languages and Operating Systems (ASPLOS'12), London, England, UK, Mar. 2012.
Pankaj Gupta and Nick McKeown. Packet classification using hierar-chical intelligent cuttings. In Hot Interconnects VII, vol. 40, 1999.
Pankaj Gupta and Nick McKeown. Algorithms for packet classification. IEEE Network, 15(2), 2001.
Jaehyuk Huh, Changkyu Kim, Hazim Shafi, Lixin Zhang, Doug Burger, and Stephen W Keckler. A nuca substrate for flexible cmp cache sharing. In Proceedings of the 19th International Conference on Supercomputing (SC'05), Cambridge, MA, Jun. 2005.
Jinho Hwang, K. K. Ramakrishnan, and Timothy Wood and. Netvm: High performance and flexible networking using virtualization on commodity platforms. In Proceedings of 11th USENIX Symposium on Networked Systems Design and Implementation (NSDI'14), Seattle, WA, Apr. 2014.
Intel Corporation. Intel data direct i/o (ddio). https://www.intel.com/content/www/us/en/io/data-direct-i-o-technology.html.
Intel Corporation. Xeon platinum 8160 processor. https://ark.intel.com/products/120501/Intel-Xeon-Platinum-8160-Processor-33M-Cache-2_ 10-GHz.
Ixia. Ixnetwork: L2-3 network infrastructure performance testing, https://www.ixiacom.com/products/ixnetwork.
EunYoung Jeong, Shinae Woo, Muhammad Asim Jamshed, Haewon Jeong, Sunghwan Ihm, Dongsu Han, and KyoungSoo Park, mtcp: a highly scalable user-level tcp stack for multicore systems. In Proceedings of the 11th USENIX Symposium on Networked Systems Design and Implementation (NSDI'14), Seattle, WA, Apr. 2014.
Asim Kadav, Matthew J Renzelmann, and Michael M Swift. Tolerating hardware device failures in software. In Proceedings of the 22nd ACM Symposium on Operating Systems Principles (SOSP'09), Big Sky, MT, Oct. 2009.
Anuj Kalia, Dong Zhou, Michael Kaminsky, and David G Andersen. Raising the bar for using gpus in software packet processing. In Proceedings of the 12th USENIX Symposium on Networked Systems Design and Implementation (NSDI'15), Oakland, CA, May 2015.
Changkyu Kim, Doug Burger, and Stephen W Keckler. An adaptive, non-uniform cache structure for wire-delay dominated on-chip caches. In Proceedings of the 10th International Conference on Architectural Support for Programming Languages and Operating Systems (ASPLOS'02), San Jose, CA, Oct. 2002.
Joongi Kim, Keon Jang, Keunhong Lee, Sangwook Ma, Junhyun Shim, and Sue Moon. Nba (network balancing act): a high-performance packet processing framework for heterogeneous processors. In Proceedings of the 10th European Conference on Computer Systems (EuroSys'15), Bordeaux, France, Apr. 2015.
Onur Kocberber, Boris Grot, Javier Picorel, Babak Falsafi, Kevin Lim, and Parthasarathy Ranganathan. Meet the walkers: Accelerating index traversals for in-memory databases. In Proceedings of the 46th IEEE/ACM International Symposium on Microarchitecture (MICRO'13), Davis, CA, Dec. 2013.
Teemu Koponen, Keith Amidon, Peter Balland, Martin Casado, Anu-pam Chanda, Bryan Fulton, Igor Ganichev, Jesse Gross, Paul Ingram, Ethan J Jackson, et al. Network virtualization in multi-tenant datacenters. In Proceedings of the 11th USENIX Symposium on Networked Systems Design and Implementation (NSDI'14), Seattle, WA, Apr. 2014.
Snehasish Kumar, Naveen Vedula, Arrvindh Shriraman, and Vijay-alakshmi Srinivasan. Dasx: Hardware accelerator for software data structures. In Proceedings of the 29th ACM on International Conference on Supercomputing (ISC'15), Newport Beach, CA, Jun. 2015.
Karthik Lakshminarayanan, Anand Rangarajan, and Srinivasan Venkatachary. Algorithms for advanced packet classification with ternary cams. In Proceedings of the 2005 ACM SIGCOMM Conference (SIGCOMM'05), 2005.
Viktor Leis, Alfons Kemper, and Thomas Neumann. The adaptive radix tree: Artful indexing for main-memory databases. In Proceedings of the 2013 IEEE 29th International Conference on Data Engineering (ICDE'13), Brisbane, Australia, Apr. 2013.
Bojie Li, Kun Tan, Layong Larry Luo, Yanqing Peng, Renqian Luo, Ningyi Xu, Yongqiang Xiong, Peng Cheng, and Enhong Chen. Clicknp: Highly flexible and high performance network processing

(56) References Cited

OTHER PUBLICATIONS with reconfigurable hardware. In Proceedings of the 2016 ACM SIGCOMM Conference (SIGCOMM'16), Florianopolis, Brazil, Aug. 2016.

Sheng Li, Jung Ho Ahn, Richard D. Strong, Jay B. Brockman, Dean M. Tullsen, and Norman P. Jouppi. McPAT: An Integrated Power, Area, and Timing Modeling Framework for Multicore and Manycore Architectures. In Proceedings of the 42nd IEEE/ACM International Symposium on Microarchitecture (MICRO'09), New York City, NY, Dec. 2009.

Sheng Li, Pradeep Dubey, Hyeontaek Lim, Victor W Lee, Jung Ho Ahn, Anuj Kalia, Michael Kaminsky, David G Andersen, O Seongil, and Sukhan Lee. Architecting to achieve a billion requests per second throughput on a single key-value store server platform. In Proceedings of the 42nd IEEE/ACM International Symposium on Computer Architecture (ISCA'15), Portland, OR, Jun. 2015.

Shuangchen Li, Dimin Niu, Krishna T Malladi, Hongzhong Zheng, Bob Brennan, and Yuan Xie. Drisa: A dram-based reconfigurable in-situ accelerator. In Proceedings of the 50th IEEE/ACM International Sym-posium on Microarchitecture (MICRO'17), Boston, MA, Oct. 2017.

Xiaozhou Li, David G Andersen, Michael Kaminsky, and Michael J Freedman. Algorithmic improvements for fast concurrent cuckoo hashing. In Proceedings of the 9th European Conference on Computer Systems (EuroSys'14), Amsterdam, The Netherlands, Apr. 2014.

Hyeontaek Lim, Bin Fan, David G Andersen, and Michael Kaminsky. Silt: A memory-efficient, high-performance key-value store. In Proceedings of the 23rd ACM Symposium on Operating Systems Principles (SOSP'11), Cascais, Portugal, Oct. 2011.

Skip Lists. A probabilistic alternative to balanced trees william pugh. Communications, of the ACM, 33(6), 1990.

Scott Lloyd and Maya Gokhale. Near memory key/value lookup acceleration. In Proceedings of the 3rd International Symposium on Memory Systems (MEMSYS'17), Alexandria, VA, Oct. 2017.

Filipe Manco, Costin Lupu, Florian Schmidt, Jose Mendes, Simon Kuenzer, Sumit Sati, Kenichi Yasukata, Costin Raiciu, and Felipe Huici. My VM is Lighter (and Safer) than Your Container. In Proceedings of the 26th ACM Symposium on Operating Systems Principles (SOSP'17), Shanghai, China, Oct. 2017.

\* cited by examiner

| Query ID | Key_addr | Table_addr | ... | Data_addr |
|---|---|---|---|---|
| 1 | | | | |
| 2 | | | | |
| ... | | | | |

| Query ID | Key_address | ... | String value | Current value / direction in string | Data_addr |
|---|---|---|---|---|---|
| 1 | | | 010 | 1 | |
| 2 | | | 110 | 0 | |

OFFLOAD OF DATA LOOKUP OPERATIONS

TECHNICAL FIELD

Various examples are described herein that relate to offload of data lookup operations.

BACKGROUND

Databases, tables, trees, and other data structures are used to provide single variable or multiple-variable associations among data and can be used for data lookup operations. A variety of organizations can be used in connection with grouping the data. Data lookup operations take place in a variety of contexts such as cloud computing, cloud storage, packet routing, and so forth. An important performance criteria in data lookup system design is the reduction of time from when a request for data is received to a time in which a response is provided.

DETAILED DESCRIPTION

Figure 1:
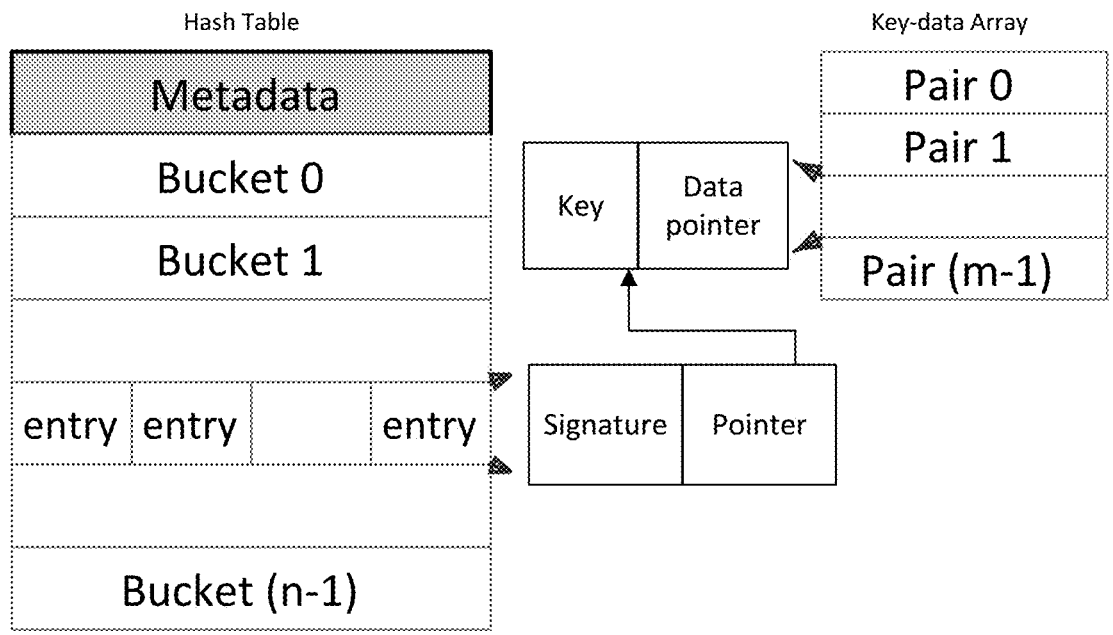
FIG. 1 depicts an example of a hash table lookup operation.

To facilitate efficient, scalable, flexible, and agile deployment of network functions, data center operators leverage virtual machine, container and more recently functions in Function-as-a-Service or Software-as-a-Service techniques to run multiple packet networking and communications functions on servers in data centers. For example, a platform can host multiple virtual network functions (VNF) on a shared server. These network functions provide network packets through a virtual switch. The VNFs, including chains of services on the same shared server, though bringing throughput and latency improvement from their close vicinity, can introduce a large amount of "virtual" network traffic on the server, which travels through the hosted VNFs (also called intra-server East-West). The traffic, processed by the software virtual switch, mostly resides within the shared physical server. Traditionally running on dedicated core(s), a recent trend of virtual switches is a move toward a distributed manner where the switching threads co-locate with VNFs to alleviate the overhead of cross-core communication. For example, in cloud native scenarios, a sidecar container providing application-level routing may share the core resources with the business logic containers in that pod. However, a virtual switch usually consumes a lot of core resources, especially considering the limited local cache capacity, which may negatively impact the performance of co-running services.

Processing network packets to categorize them into flows with a set of predefined rules, also called "flow classification," is a functionality of virtual switches. In general, packet processing on multiple fields is a challenging problem, especially on general-purpose servers where massive amounts of network traffic travels from one network function to another. To improve the performance of flow classification, algorithmic optimizations are used. These most frequently fall into two categories: tree-based (e.g., trie-based) and hash-based algorithms. Among them, the hash-based approach has proven to provide performance in terms of both table lookup and update. Hash-based lookups have been widely used in modern software virtual switches such as Open vSwitch (OVS), vector packet processing (VPP), and Tungsten Fabric vRouter. For example, to determine flow classification, a hash of a packet header or portion of a packet header can be performed where the packet header (or portion thereof) represents a key. A data pointer corresponding to the key can be looked up in memory or cache.

For example, a virtual switch can be any software and/or hardware device that provides one or more of: visibility into inter-virtual machine communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HFSC qdisc; per VM interface traffic policing; network interface bonding with source-MAC load balancing, active backup, and L4 hashing; OpenFlow protocol support (including many extensions for virtualization), IPv6 support; support for multiple tunneling protocols (GRE, VXLAN, STT, and Geneve, with IPsec support); support for remote configuration protocol with C and Python bindings; support for kernel and user-space forwarding engine options; multi-table forwarding pipeline with flow-caching engine; or forwarding layer abstraction to ease porting to new software and hardware platforms.

As network services commonly leverage multiple CPU cores to scale up its throughput, the concurrent data structures are widely used in network functions and virtual switches, bringing another significant variable—latency. Delay can come mainly from two sources: the hardware core-to-core communication and the software locking mechanism for concurrent data structures.

At least in connection with lookup operations connected with flow classification, according to various embodiments, central processing unit cores are to offload hash-table lookups to a lookup engine so that the CPU does not use compute cycles for hash-table lookups or tree traversal. The lookup engine can be used to accelerate flow classification lookup in a last level cache (LLC). Various embodiments provide one or more of the following features: active flow counting for determination of use of software-based query or lookup engine query, instructions to invoke the lookup engine, a query distributor, a query pipeline with hardware-accelerator features, and a cache lock for read/write concurrency.

In the cases where flow classification is to use hash table lookup or tree traversal, to decide whether to use software based lookup or a lookup hardware engine, the core can use a linear counting based profiling to record active flows within a period of time. For a hash-table lookup or tree traversal, the number of active flows can be used to determine whether lookup content can be cached into local cache (L1/L2). For the cases that the flow tables can be cached into L1 or L2 cache, software-based lookup operations may achieve higher performance due to lower data access latency and core's powerful computation capacity. A branched instruction can be executed whereby if the flow counter is less than a threshold, then a software-based lookup is used. But if the flow counter indicates a threshold number or higher number of flows, the query offload engine can be used for lookup.

Various embodiments can provide at least for offloading of hash table lookup, tree traversal, or decision tree traversal to a lookup engine to identify a data pointer in a data structure. A core can select use of a lookup engine and issue a query instruction for data that specifies one or more of: a key address, a table address, and/or a result address. The key address can specify a memory location of a key associated with the query instruction. The table address can specify a memory location of a table that is used in connection with the key to locate a memory location of the data. The result address can refer to a location in memory in which a result of the query is stored. In some examples, the query instruction can include the key address and the result address and the table address can be stored in a register. A decoder can translate the query instruction and the one or more of: key address, table address, and result address into a packet or instruction. The decoder can be implemented by a core that issued the instruction or the decoder can be a separate device that receives the instruction or a translation of the instruction. A query distributor can determine which lookup engine to process the decoded instruction. The query distributor can direct the lookup queries from the core to certain lookup engine(s), a hash function circuit or operation can be used for mapping regular memory accesses to an LLC slice by calculating the identifier of the LLC slice where a query will be executed. In one embodiment, distribution to a lookup engine can be pseudo-random for load balancing. For example, in some cases, a lookup engine can be paired with a particular cache slice. Accordingly, query distributor can send a query to a lookup engine associated with the selected LLC slice.

In one embodiment, a lookup engine can be configured at least to perform hash table lookup, trie traversal, or decision tree traversal. For example, the hash table lookup, trie traversal, or decision tree traversal can include hardware or FPGA-implemented state machines that provide corresponding function implementations. In an example, the lookup engine can be coupled to an LLC slice. A cache slice can include one or more cache lines of a last level cache. For example, one or more cache lines of an L3 cache line.

On some tiled CPU chips, along with multiple cores, the last level cache can be physically separated into slices with a Non-Uniform Cache Access (NUCA) Architecture organization. Last level cache (LLC) can refer to a highest-level cache that is usually shared by all the functional units on the chip (e.g. CPU cores, integrated graphics processor (IGP), and digital signal processor (DSP)). The LLC can be an L3 from a core perspective and L4 from a GPU perspective. Each LLC slice can have an associated lookup engine that handles requests from cores and also maintains cache coherency across multiple copies of the same content. Each core can have its dedicated LLC slice that is physically connected to a core but logically shared with other cores.

Various embodiments provide a near-data acceleration approach for flow classification or other lookup operations by use of a Caching and Home Agent (CHA) available in some Intel multi-core CPU chips and configuring a CHA to speed up the data lookup in an LLC. A CHA, or other device that is used instead of or in addition to a CHA, can be configured to provide for one or more of: command queuing, meta data caching, a scoreboard to track data retrieval and query execution progress, a hashing operation, a comparator operation, a masking operation, and a result queue. Flow lookup throughput and tuple space search for flow classification can be accelerated with negligible negative impact on the co-running network services. For example, energy-efficiency can be improved over a ternary content addressable memory (TCAM) with trivial tiles area overhead, while still providing functionality similar to a traditional TCAM.

In the example of a hash table lookup, the lookup engine can provide one or more of: a query queue, progress tracking scoreboard, a hardware-implemented hash calculator, a hardware-implemented comparator, and a result(s) queue. The lookup engine can query one or more cache slices to find a key associated with a key address. The lookup engine can hash the key using the hash calculator to generate a signature. The signature can be a smaller size (in bits) than the key. The signature can be compared against signatures stored in a cache slice. For a signature match, a reference key can be retrieved. The key and reference key can be compared using the comparator and if there is a match, a data pointer is provided. The data pointer can be provided as a result to the core via the result queue that requested the hash table lookup.

In the example of a tree traversal, the lookup engine can provide for masking of input string to provide a relevant direction (e.g., 1 or 0), a comparator to compare single bits or stride of bits, a scoreboard for a tree traversal progress tracking, and a result. The tree traversal progress can be for example, 010 (left, right, left) or some tree traversal path.

Examples described herein can be used in connection with database query offload. For example, key-value stores such as Amazon Dynamo, Google BigTable, Cassandra, and other databases can use techniques described herein. In accordance with some embodiments, a lookup offload engine can be used to perform a pre-query check prior to issuing a query to determine whether a key-value pair is stored in memory or available. For example, a Bloom Filter representation of a key-data array can be available. A hashing feature of the lookup engine can be used to determine a bit vector formed from a hash of parts of the key. A comparator feature of the lookup engine can be used to compare the bit vector against an entry in the Bloom Filter to determine the likelihood that a key-value pair is present in memory. If the likelihood is below a threshold, then a query operation for the key-value pair may not be requested by an application, whether in software or by use of a lookup engine. Various embodiments that use a pre-query check can be implemented in a network interface.

FIG. 1 depicts an example of a hash table lookup operation. A table from which a lookup is to be performed can be stored in memory starting at a table address. Table metadata stores the necessary information of the table, such as table size, key length, and hash function type. The hash table contains an array of buckets. A bucket can occupy and align with one CPU cache line (e.g., 64 bytes). A bucket can be associated with several entries, where an entry has a signature and a pointer to the key-data pair. In this example of hash table lookup procedure, a provided key is hashed to retrieve an index of a corresponding bucket in the table. A primary bucket and secondary bucket can be used to avoid duplicated key use. For example, a key can be 3-way hashed to generate a signature, a primary bucket index (that can refer to multiple buckets 0 to n), and a secondary bucket index (that can refer to multiple buckets 0 to m). Hashed keys that match a signature in a bucket lead to retrieval of the associated key-data pointer pairs. The key portion of the key-data pointer pair is compared against the key from the query. If there is a match, the data pointer can be used to retrieve the data that is requested. For example, the data pointer can be used to retrieve data (e.g., timing stamp, packets, and so forth). The data can be stored in memory and brought into a cache (e.g., LLC) for use.

Figure 2:
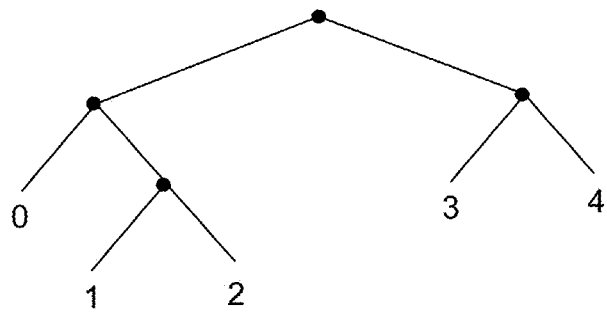
FIG. 2 depicts an example of tree lookup operation.

For example, packet processing can use tree-based lookup operations. A packet processing library that uses a tree type data structure is Data Plane Development Kit (DPDK). Decision trees or trie lookup can be used in many contexts such as machine learning or artificial intelligence. FIG. 2 depicts an example of tree lookup operation. In this example, a zero value can signify a left movement in the tree where as a one value can indicate right movement in the tree. Accordingly, directions of 010 can traverse the tree via left, right, left and provide a result associated with node 1.

Figure 3:
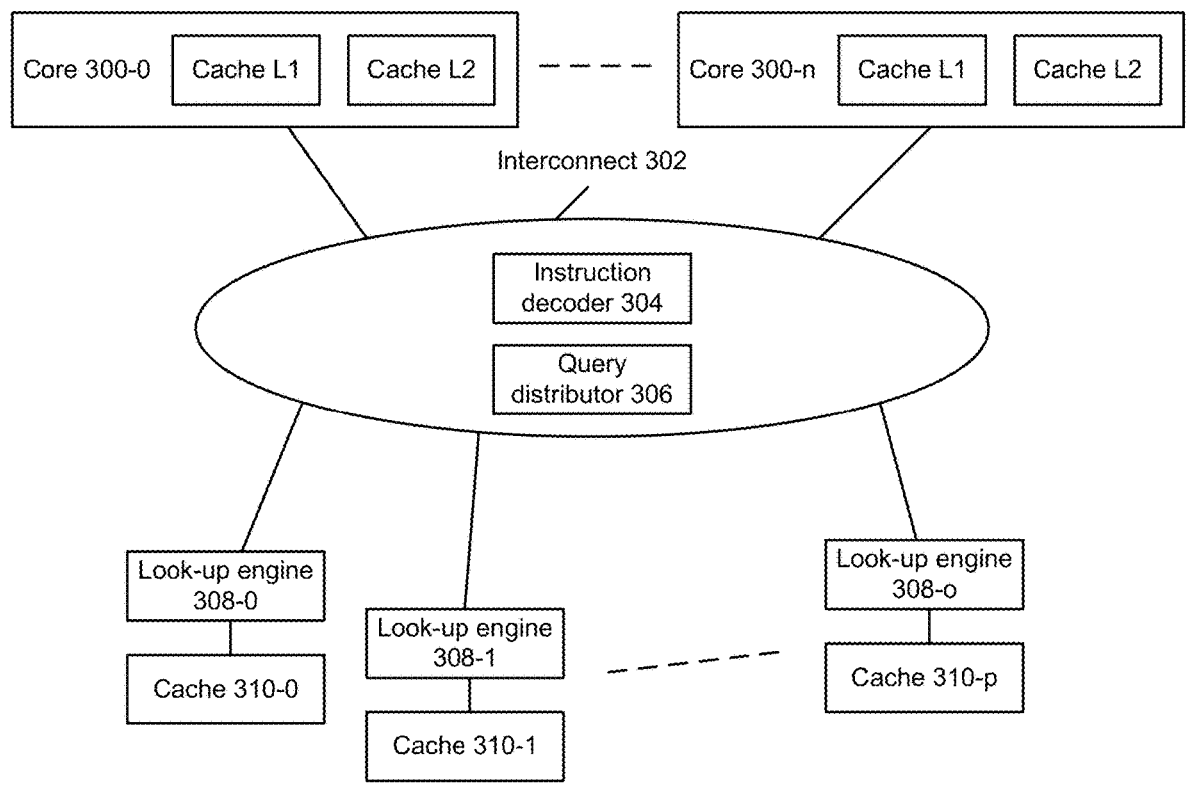
FIG. 3 depicts an example system.

FIG. 3 depicts an example system. Cores 300-0 to 300-n can be connected to an interconnect 302. Cores 300-0 to 300-n can be a processor, execution core, or computational engine that is capable of executing instructions. Cores 300-0 to 300-n can have access to their own level 1 and level 2 cache and read only memory (ROM), or they can share cache or ROM. Cores 300-0 to 300-n can be homogeneous and/or heterogeneous devices. Any type of inter-processor communication techniques can be used, such as but not limited to messaging, inter-processor interrupts (IPI), inter-processor communications, and so forth. Interconnect 302 can provide interconnection between cores 300-0 to 300-n using a bus, ring, mesh, or other topologies. Interconnect 302 can be compliant with a variety of public or proprietary standards. For example, interconnect 302 can comply with PCI Express, Intel® On-Chip System Fabric (IOSF) compliant, or other standards or proprietary formats. For example, any or the entirety of the system of FIG. 3 can be integrated into a network interface such that flow lookup can occur in a network interface and pointers to lookup results can be embedded as part of metadata that passed along from the network interface to a CPU, such as a Xeon system-on-chip.

In response to a packet processing operation or any data lookup operation, any of cores 300-0 to 300-n can issue an instruction for a table lookup or tree traversal. The instruction can include one or more of: a key address, a table address, and a result destination. The key address can specify a location in memory in which a key is stored. The table address can specify a location in memory of a start of a table. The result address can refer to a location in memory in which a result of the query is to be stored. Various instruction format examples are described later.

Instruction decoder 304 can translate the instruction into a packet. The packet can be provided to query distributor 306 for distribution to a lookup engine 308-0 to 308-o. Query distributor 306 can determine which lookup engine is to process the instruction. In some cases, distribution or instruction packets to a lookup engine 308-0 to 308-o can be determined using a pseudo-random selection process for load balancing. In some examples, instruction decoder 304 can be executed by a core, or incorporated within a core, or accessible to the core.

Queries from the same core could be dispatched to different accelerators to exploit the parallelism. In an example, query distributor 306 hashes the key's address and the hash value is used to decide which LLC slice (and associated lookup engine) the query should be sent to. The advantage of hashing the key rather than hashing the table address is to maximize the parallelism even if all the lookups are targeting at the same hash table, although certain keys may be sent to a further slice from the core. Also, to avoid congestion, when a certain lookup engine is saturated with uncompleted queries, it may set a "busy" bit to query distributor 306. Until this "busy" bit is cleared, query distributor 306 will not send any query to the corresponding lookup engine.

Each lookup engine 308-0 to 308-o can be associated with a respective cache 310-0 to 310-p. In an example, a lookup engine 308-0 to 308-o is integrated into a same package or die with a respective LLC slice 310-0 to 310-p. Various lookup engines 308-0 to 308-o can process multiple queries simultaneously.

During a lookup processing, the corresponding cache lines in an LLC slice can be locked from concurrent write operations by any core by setting the lock bit in the cache line's metadata. Meanwhile, the hash value of the key can be used to update a bloom filter or flow counter to record the number of active flows or key lookup activity. The flow counter value can be sent to the core or written to a memory location for a core to use to determine if an LLC slice has a metadata table and if a lookup engine is to be used for lookup acceleration or to execute a lookup instruction on the core itself.

In some examples, a lookup engine formed in the same die or package as a mid-level cache (MLC) (e.g., L2 cache). The LLC can be provided in an uncore (or its equivalent) or system agent. An uncore or system agent can include or more of: a memory controller, a shared cache, a cache coherency manager, arithmetic logic units, floating point units, core or processor interconnects, or bus or link controllers. The uncore or system agent can provide access to external devices using links such as one or more of: a PCI express (PCIe) link compliant for example with PCIe Specification Version 1.0 (2017) and earlier or later version, an Intel® Ultra Path Interconnect (UPI) link, an Intel® QuickPath Interconnect (QPI), a System Management Bus (SMBus) link, and an optical link. The uncore or system agent can provide one or more of: DMA engine connection, non-cached coherent master connection, data cache coherency between cores and arbitrates cache requests, or Advanced Microcontroller Bus Architecture (AMBA) capabilities. In another example, the lookup engine can be formed in the same die or package as a memory controller and accessible at least using the memory controller. In yet another example, the lookup engine can be a standalone device connected with other cores via an interconnect. In some examples, the lookup engine can access an LLC, MLC, or memory regardless of whether the lookup engine is coupled to or formed with an LLC, MLC, or memory controller.

Figure 4:
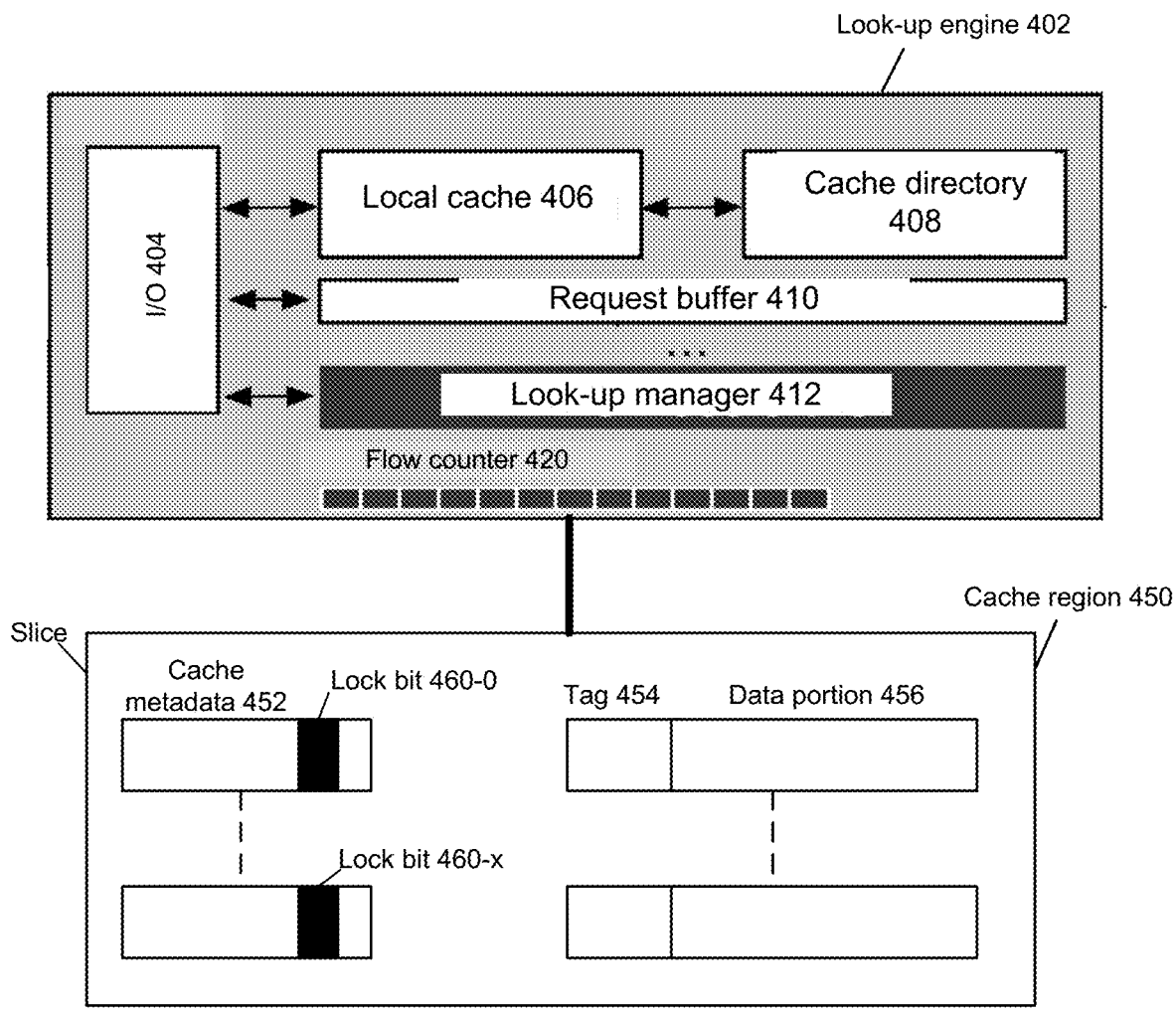
FIG. 4 depicts an example of a lookup engine and a cache region.

FIG. 4 depicts an example of a lookup engine 402 and a cache region 404. In some embodiments, lookup engine 402 and cache region 450 can be formed in the same die or package. Input/output (I/O) 404 can receive commands in packets and/or provide results in response to performance of the commands. For example, a core can issue an instruction to lookup engine 402 and the instruction can be received at I/O 404. Request buffer 410 can buffer queries or instructions to access data. Local cache 406 can cache some data that is accessible from cache region 450. To save time and cache transactions, in some cases, content from local cache 406 can be accessed instead of accessing content from cache region 450. If content that is to be accessed to perform an instruction is stored in local cache 406, then the content can be accessed from local cache 406 instead of cache region 450. Cache directory 408 provides a cache directory that records which cache regions have a copy of content stored in cache region 450. Cache directory 408 can be used to maintain cache coherency between cache region 450 and other cache regions or to invalidate other copies in other cache regions. A result from execution of the instruction can be provided via I/O 404 to the core. For example, a result can be a pointer to a starting memory address of a data.

In some cases, a processor-executed software-based hash-table lookup can be used, for example, when an active flow count is small and the majority of the relevant data has already resided in the L1 cache or in the register files. Hence, a run-time adaptive mode-switching mechanism provides for switching between offload-engine lookup and software-implemented lookup based on a count of a number of active flows and/or offload-engine availability defined by corresponding queue depth or "busy" flag raised by the engine. Flow counter 420 can be used to count a number of active flows or queries involved with accessing data from cache region 450. A hash-based bitmap can be used to capture a number of active flows based on a linear counting algorithm. Linear counting is an efficient way to estimate the cardinality of a set of elements with low time and space complexity. When a lookup request arrives at the lookup engine, one bit in the bitmap can be set indexed by the least significant bits from the primary hash value calculated during lookup. After each time window, the bitmap is scanned and the count of unset bits are recorded to core's performance counter registers for program to read and the bitmap is reset. An estimate of the number of active flows in that time window can be based on the following formula: n=m log (m/u), where m denotes the size of bitmap, and u denotes the number of unset bits. To switch to use of lookup engine, a program itself needs to keep a software linear counting to do similar profiling. The program can be a library or user application which performs or calls a lookup function, e.g., a routing application, database search, and so forth. However, since software lookup is only chosen when flow count is small and the server/engines are not busy, the overhead of such cardinality estimation should not be a concern.

Cache region 450 can provide an LLC slice or slice of cache data. For example, an LLC slice can include copies of content of thousands of cache lines. Cache metadata 452 can store information concerning the slice including but not limited to: a lock bit, dirty state, or invalid. Lock bit 460-0 to 460-x of cache metadata 452 can be used to achieve the atomicity of the read/write operations. In this example, a lock bit 460-0 to 460-x is provided for each cache line. In the case of a hash table lookup, when lookup engine 402 executes a query, a bucket index has been calculated and the corresponding cache line which stores the targeted bucket will be locked by setting one of lock bit 460-0 to 460-x. During locking, any modification to the cache line will be forbidden.

Tag 454 can provide a tag to indicate a cache line (or portion of a cache line) whose content is stored in a corresponding data portion 456. Data portion 456 can store content from one or more cache lines. In the case of hash table lookup, data portion 456 can store a metadata table, buckets, and key-data array. In the case of a tree traversal, data portion 456 can store tree content and tree arrangement information.

For example, an execution of an instruction can cause lookup manager 412 to determine if content associated with the query is stored in local cache 406. If so, then the content can be loaded from local cache 406 instead of cache region 450. The content can be tables used for hash table lookup or tree traversal. A lock bit 460-0 to 460-x, corresponding to a cache line that stores the content accessed from local cache 406, can be set to lock any writes or reads from the corresponding cache line. For a hash-table lookup, after signature comparison, if a match is found, the corresponding key-data pair cache line will also be locked until the data pointer is returned to lookup engine 402. Based on results of the query via hash lookup or tree traversal, a result of a memory address pointer to data resulting from the query can be provided via I/O 404 or a null result can be provided indicating there was no match.

Figures 5, 6A, 6B:
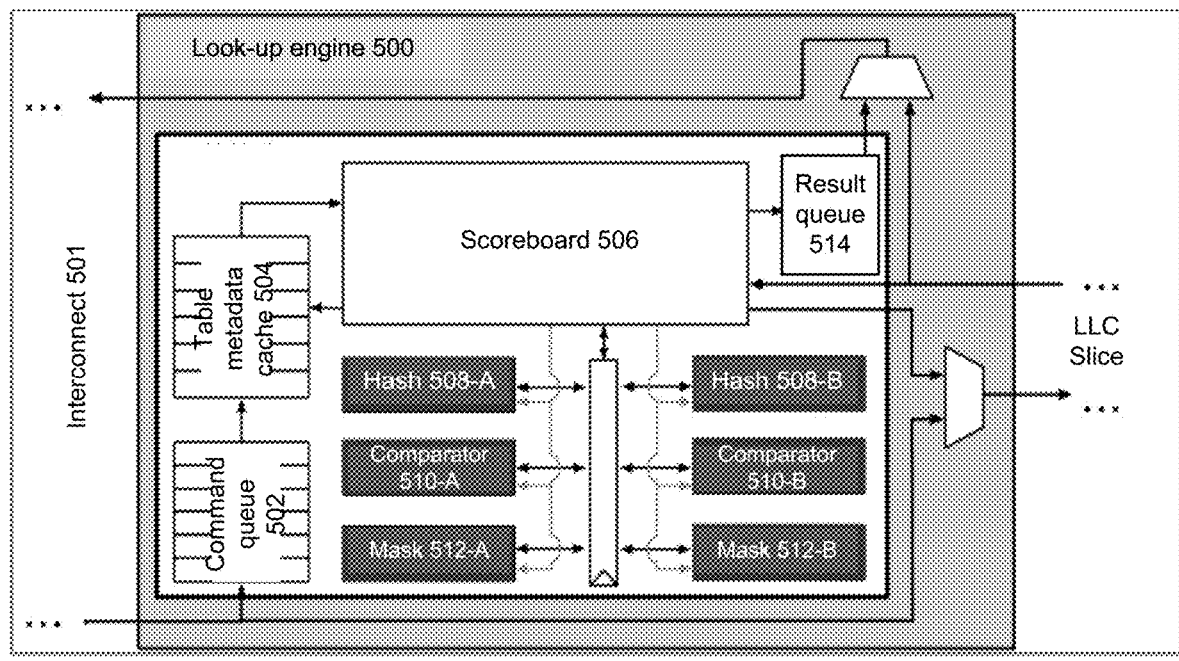
FIG. 5 depicts an example of a lookup engine.
FIG. 6A depicts an example of content of a scoreboard that can be used to track progress of a hash-table lookup.
FIG. 6B depicts an example of content of a scoreboard that can be used to track progress of a tree traversal lookup.

FIG. 5 depicts an example of a lookup engine. In an example, lookup engine 500 can include or access a command queue 502, table metadata cache 504, scoreboard 506, hash unit 508-A and B, comparator 510-A and B, mask 512-A and B, and result queue 514. Interconnect 501 can provide receive and transmit capabilities between lookup engine 500 and other lookup engines, a query distributor, or an instruction decoder, among others. Interconnect 501 can provide a received instruction packet to lookup engine 500. A received instruction packet can include a table address, key address, and result destination. The received instruction is stored in command queue 502.

In an embodiment, when the instruction is able to be dispatched from command queue 502, table metadata cache 504 can be accessed to determine if relevant metadata information is stored or tree traversal information is stored. For example, table metadata cache 504 can provide metadata that indicates what kind of lookup-table is stored (e.g., one bucket per key or multiple buckets per key) and whether the table is tree or for hash-table lookup. Table metadata cache 504 can be implemented as a random access memory (RAM) device. If a table address referenced by the received instruction has a corresponding entry in table metadata cache 504, then the information can be accessed from cache 504 instead of accessing the information from an LLC slice. A coherency scheme can be applied among other metadata caches of other lookup engines and also cache lines that store content cached by table metadata cache 504 to attempt to maintain data consistency among meta data caches and cache lines.

In an example, in the case of a hash table lookup, the instruction query from command queue 502 is provided to scoreboard 506 and scoreboard 506 generates at least several actions in sequence. First, based on the key address passed by the instruction, scoreboard 506 generates a data request to fetch the key from an LLC slice. Second, after the key has been returned, hash 508-A or B performs a hashing operation for the key and calculates the indexes of the buckets. Third, scoreboard 506 generates a request for contents of the buckets. Fourth, a comparator 510-A or B compares the signature in each entry of the primary bucket to find a match. If the key in the key-data pair does not match any obtained in the primary bucket, the same actions will be applied on the secondary bucket and so forth. Fifth, after all actions have finished, scoreboard 506 commits the query, pushes the result back to result queue 514, from where the result will be provided to its designated destination.

Scoreboard 506 can orchestrate operation of lookup engine 500. Scoreboard 506 can track execution progress of each instruction based on its identifier (ID), track data requests to an LLC slice or memory, and provide results to the designated destination (e.g., returns to core for blocking instruction or writes to a memory location for non-blocking instruction). For example, for table lookup or tree traversal, lookup engine 500 uses at least one of hash units 508-A and B, mask units 512-A and B, and comparators 510-A and B.

For example, for a hash lookup operation, lookup engine 500 retrieves a key from a key address specified in the instruction. The key address can be stored in an LLC slice that is coupled to lookup engine 500 or accessible through an interconnect. Lookup engine 500 can calculate or broadcast the key address (e.g., an address in memory) to all LLC slices to retrieve a latest copy of key. If an LLC slice has a copy of the key, then the LLC slice will provide the key. If there no match by an LLC slice or the response takes too long, lookup engine 500 can retrieve the key from a key address in memory and store the key into the LLC slice partner to lookup engine 500.

Some or none of the bits of the retrieved key can be hidden using a mask unit 512-A or B (or both). The key, after any masking (or no masking) can be provided to hash 508-A or B (or both) for application of a hashing operation. A hash operation associated with signature generation and bucket index generation can be applied by hash 508-A or B and specified for use for the instruction. Hash unit 508-A or B can be configured to apply any of a variety of hashing operations. Hash unit 508-A or B can provide a signature and bucket index. The bucket index can be used to retrieve a bucket from a hash table. The signature generated by hash unit 508-A or B can be used by comparator 510-A or B for comparison with one or more signatures stored in the retrieved bucket(s). Comparator 510-A or B can be used to compare the generated signature against signatures from bucket(s). For a signature match, the pointer associated with the signature is used to retrieve a key/data pointer pair from a key-data array that is stored in an LLC slice or in table metadata cache 504. Comparator 510-A or B can be used to compare the retrieved key against the key in the key/data pointer pair. For a match, the data pointer to the data associated with the instruction query is provided as a result in result queue 514. A zero (or null) will be stored in result queue 514 if lookup engine 500 fails to find a matched key-data pair. A core that issued the instruction can access the result from result queue 514.

The following provides an example of use of lookup engine 500 for a tree traversal. A received instruction can specify a key address, table address, and results address. The key address can be used by lookup engine 500 to retrieve a key in a similar manner as applied for hash-table lookup. The instruction for a tree traversal can indicate a tree traversal is to take place. Stored metadata indicates that the data structure is a tree data structure. For example, a binary-tree with stride of 1 can be specified, meaning at each node a comparison of 1 bit is made. Lookup engine 500 can walk the key (input string) through the tree, where each "0" points to the left path and "1" points to the right path. Mask unit 512-A or B masks some or none of an input string to provide relevant part. For example, referring to the tree of FIG. 2, an input string 010 corresponds to the path starting at the root and ending in a node 1. Mask unit 512-A or B can mask bits in the input string to provide a single bit indicating a direction (left/right) or mask a stride of bits. First a left-turn (0) is taken, then a right-turn (1), and finally a turn to the left (0) to node 1. The value at node 1 can be compared against the key using comparator unit 510-A or B. If there is a match, a pointer associated with the key can be provided as a result to the instruction issuer in result queue 514.

Lookup engines access multiple memory locations for each key lookup including the table metadata, queried key, table buckets, and the key-data pairs. A memory protection mechanism is provided to protect against malicious applications accessing other processes' memory space. For example, input-output memory management unit (IOMMU) can be used so that any device can only see virtual addresses rather than physical ones. Another example provides for use of contiguous memory for a table layout and performing simple boundary checks to address a security concern with certain assumptions on the hash table and the queried key. First, when a core executes a lookup instruction, key address and table address will go through memory management unit (MMU) as regular memory access instructions. A core uses virtual addresses and the MMU can translate the addresses to physical addresses. The MMU also returns page size of the hash table and key together with the physical addresses. After the lookup request reaches a lookup engine, a boundary check is carried out. Prior to insertion of a lookup request into a scoreboard, the lookup engine checks if the hash table and the keys are not spreading across multiple physical pages using the page size, the addresses, and the hash table metadata. If the lookup operation will span across multiple physical pages, it will not be performed, and a hardware exception will be triggered and the lookup request is not added to the scoreboard. This mechanism provides memory allocation restrictions to the software data structures. Specifically, the table, key-data pair, queried keys, and the result destination addresses for the non-blocking lookup cannot be allocated across multiple virtual pages. Hash table and key-data pair share the same page. This feature can be satisfied in modern user-space networking functions and a lot of high performance data structures because of the use of huge pages. For example, DPDK commonly uses 2 MB or 1 GB huge pages to allocate any of its main data structures. Hash table data structure can be allocated within one huge page and the packet header buffer uses the same or another huge page.

In another example, privileged software (e.g., kernel model) can define a memory address range and an application cannot access memory beyond this range. The privileged software provides the range to the lookup engine before any application or program can use a lookup engine. The lookup engine is able to check if the memory address to be accessed falls inside the range and is permitted. If the memory address requested is out of range, the lookup engine abandons the access attempt to comply with security-driven rules. Other manners of limiting memory accesses in a lookup operation can be used FIG. 6A depicts an example of content of a scoreboard that can be used to track progress of a hash-table lookup. In this example, a query ID can be assigned to each instruction. A key address (Key_addr) and table address (Table_addr) can be associated with each instruction. A data address (Data_addr) field can be provided to store a resulting data pointer. Other fields can be added in the scoreboard such as key value retrieved from the key address, calculated signature (a hash of a key value), retrieved signature value from a bucket, retrieved key value from a key-data array, or retrieved data pointer.

FIG. 6B depicts an example of content of a scoreboard that can be used to track progress of a tree traversal lookup. Some of the fields (e.g., query ID, Key_addr, Table_addr, and Data_addr) used in the scoreboard of FIG. 6A can also be used in the scoreboard example of FIG. 6B. A string value can be stored as well as a current value (direction) in a string.

Example instruction formats are described next. As discussed, a lookup engine is provided with a table address, key address and result destination for each query. To shorten the instruction length, the general purpose register (e.g., RAX, RBX, EAX) can be used as an implicit operand to store a table address, while the other two are explicit operands. Multiple subsequent table lookups are usually sent to the same table in real world applications and thus the table address register can be reused. An instruction decoder can be used to decode an instruction and reference a table address in a register and form an instruction packet for execution by a lookup table. Instruction formats, names, syntaxes, and other aspects of the instructions can be varied from the examples provided.

Instruction LOOKUP_B (mem.key_addr, reg.result) provides a blocking version of a query instruction. Instruction LOOKUP_B provides the key address to the accelerator for lookup and returns the result to the instruction's specified register. This instruction has two explicit operands: key address and result register and utilizes the implied general purpose register to provide the table address during instruction execution. An instruction decoder can retrieve the table address and decode the instruction and format a query packet that is sent to a query distributor. The blocking version of the lookup may block the pipeline to a slice serviced by the lookup engine while waiting for returning results from the lookup engine so that no other core can access the lookup engine that is performing an instruction for a core.

Instruction LOOKUP_NB (mem.key_addr, mem.result) provides a non-blocking version of the lookup instruction. LOOKUP_NB generates queries that send the key address, table address, and a memory location for the results destination to the accelerator. This instruction has two explicit operands: key address and result register and utilizes the implied general purpose register to provide the table address during instruction execution. An instruction decoder can retrieve the table address and decode the instruction and formats a query packet that is sent to a query distributor. Since the result destination is a memory address, rather than returning results to the core, the lookup engine writes the result to a designated memory location. As a result, LOOKUP_NB does not block a pipeline to the lookup engine that handles the lookup operation while the lookup engine is processing the requests. The query requester (e.g., core) checks with the results location later to obtain the results once they are ready. Accordingly, the results may not be returned to the core or accessed by the core as immediately as blocking mode via instruction LOOKUP_B.

The non-blocking mode involves execution of a SNAPSHOT_READ instruction (e.g., one per 8 queries) to access cache line for the results. Instruction SNAPSHOT_READ (mem.result_addr, reg.result) provides for reading a snapshot of result data without changing the ownership of the cache line. Instruction SNAPSHOT_READ takes a "snapshot" of the current value from the memory location specified by the first operand (source operand) and copies the snapshot into the general-purpose register given by the second operand (destination operand). The ownership state of the cache line of the source operand, if found in the cache hierarchy, will not be modified. In non-blocking mode, because the lookup engine is responsible for writing back the results, using SNAPSHOT_READ helps keep the cache line in the LLC, avoiding cache line bouncing among core's local caches and LLC. The amount of snapshot data is decided based on the operating mode of the processor and the instruction encoding used, and may be word, doubleword, quadword, or a full cache line (64 bytes) into a ZMM register. To efficiently use SNAPSHOT_READ together with LOOKUP_NB and further reduce polling overhead, the program that requests a lookup can issue a batch of LOOKUP_NB instructions with the destination addresses contained in one cache line. The program then snapshots this whole cache line and finds if all the results are ready. For example, the original cache line are zero and lookup engines write non-zero pointers into the cache line when each lookup succeeds. The program can snapshot the whole cache line and can use Intel AVX instruction_mm256_cmpeq_epi64 to find if all the results are ready (i.e., non-zero).

Figure 7:
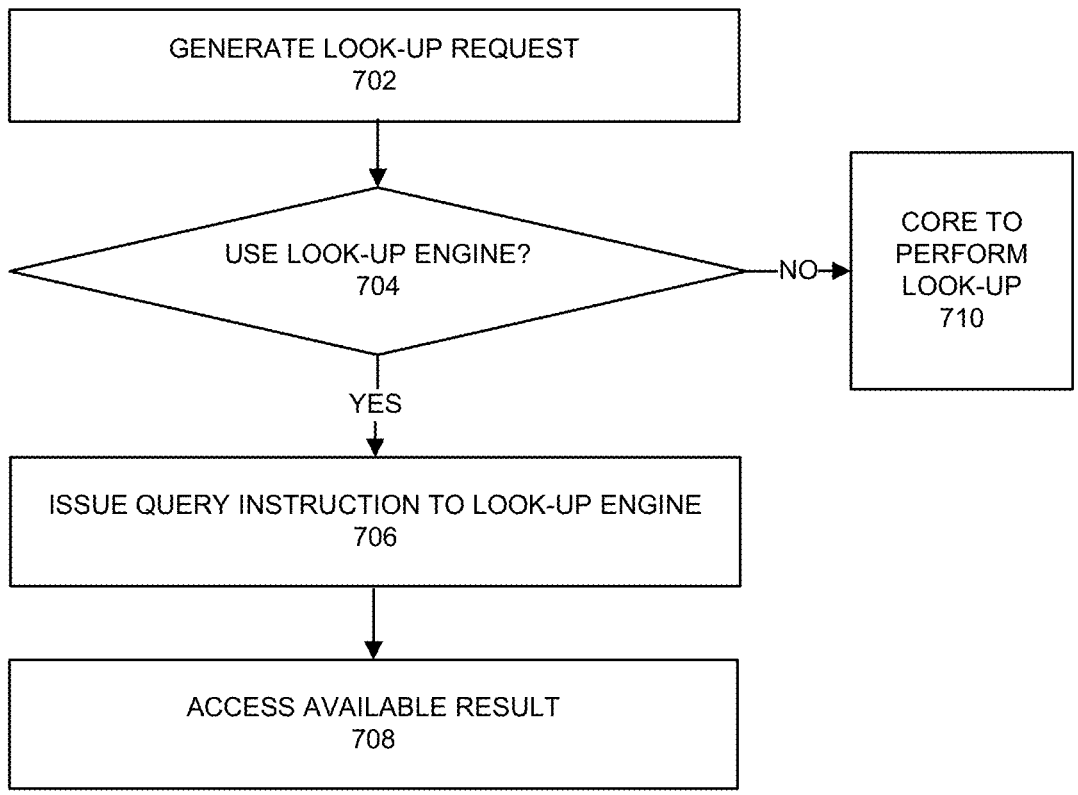
FIG. 7 depicts an example process that can be performed to request a lookup operation.

FIG. 7 depicts an example process that can be performed to request a lookup operation. At 702, an application can issue a request to perform a lookup operation. For example, a data base program, a software virtual switch, or other software can request a lookup of data. The data can be stored in cache, memory, or storage. At 704, a core can determine whether to use a lookup engine. For example, the core that executes the application can determine whether to use a lookup engine or perform the lookup by executing software at the core. A core can decide to use a lookup engine based on a likelihood that requested data is stored in last level cache. For example, when a virtual switch requests a lookup operation, the number of active flows that access content stored in a last level cache can be correlated with a likelihood that the last level cache stores the content requested by the virtual switch. If the number of active flows is at or above a threshold, then at 706, the lookup engine can be invoked. Otherwise, if the number of active flows is below a threshold, then at 710, the core can manage retrieval of data using software instructions and without use of the lookup engine.

At 706, the core can issue an instruction that specifies one or more of: a key address, a table address, and a result address. A register can be used to store a table address, for example. The instruction can provide for blocking or non-blocking of a lookup engine that performs the request. Blocking of the lookup engine can involve not allowing the lookup engine to receive instructions from another core or for another core to access the lookup engine until the result of the instruction is provided to the requester core. Non-blocking of the lookup engine can provide for allowing any core to access the lookup engine while the instruction is being performed. A decoder can be used to decode the instruction and format an instruction for execution by the target lookup engine. For example, the decoder can form a packet that includes the key address, table address, result address, and indicates blocking/non-blocking. A query distributor can determine which lookup engine is to perform the instruction and forward the instruction to the selected lookup engine. The query distributor can select a lookup engine based on mapping a table address to an associated LLC slice by using current CPU address hashing or other load balancing methods.

At 708, the core can access a result from the query operation. For example, the core can retrieve the result from a data structure in or accessible to the lookup engine. In an example, the result can be provided to the lookup engine at a memory address associated with a result. The result can be a pointer to a starting memory address of data. The length of the data can be specified in the metadata table. In some cases, if no data is found in response to the instruction execution, a null result is returned and available for the core to access.

Figure 8:
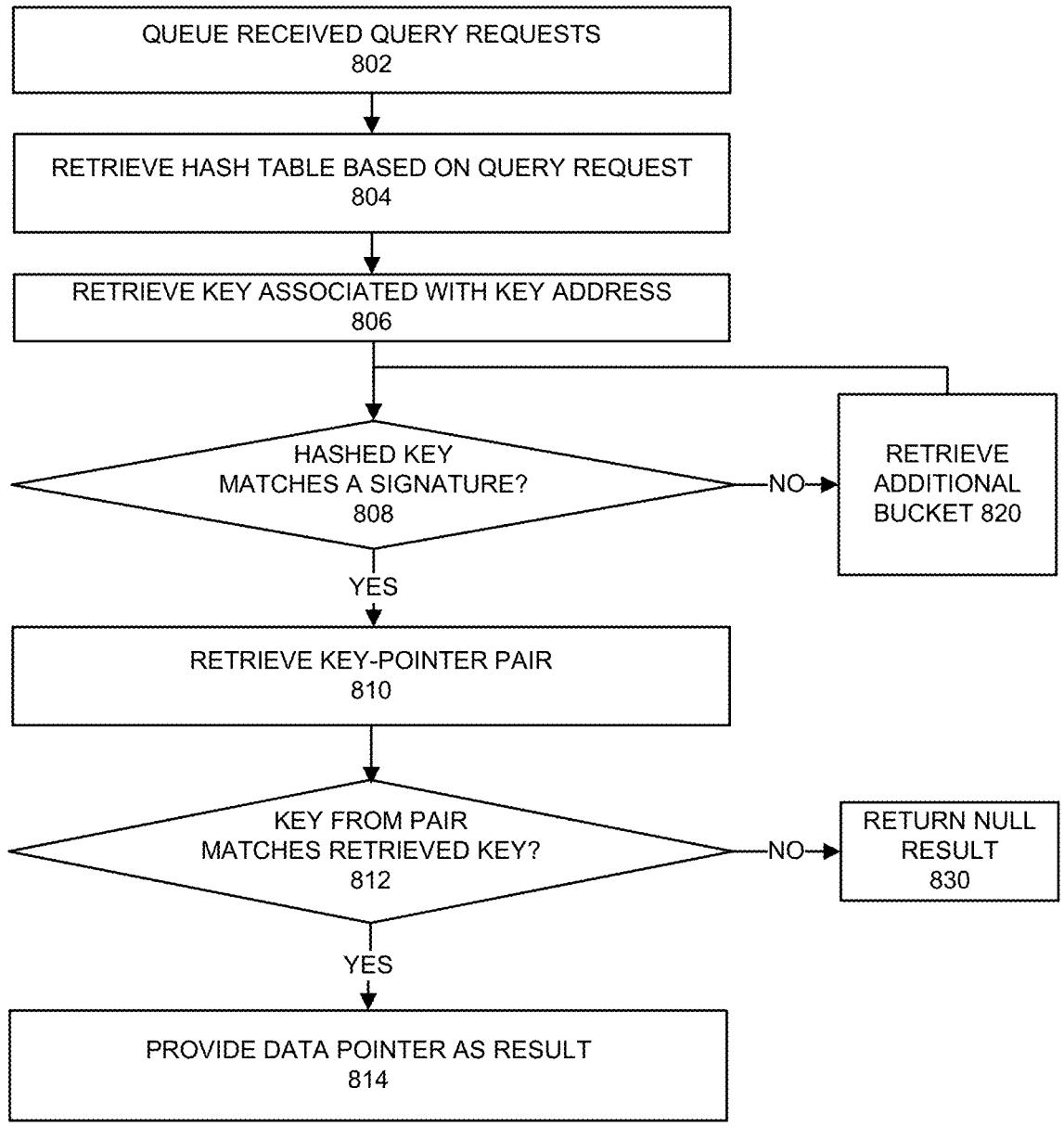
FIG. 8 depicts an example process that can be used to perform a hash-table lookup using a lookup engine.

FIG. 8 depicts an example process that can be used to perform a hash-table lookup using a lookup engine. During the process of FIG. 8, a scoreboard can be used to track the progress of data retrieval and comparisons and/or the scoreboard can be used to initiate operations such as lookups, hash operations, or comparisons. At 802, a received query request is queued for execution. For example, the query request can be provided by a query dispatcher and received at a lookup engine. The query request can identify itself as associated with a hash table lookup and provide a key address, table address, and result address. At 804, a hash table can be retrieved based on the table address. For example, the hash table can include meta data that indicates what kind of lookup-table is stored (e.g., one bucket per key or multiple buckets per key) and whether the table is tree or for hash-table lookup and also include buckets of signature-pointer pairs. Also, a key-data array associated with the table address can be retrieved. The hash-table and/or key-data array can be retrieved from an LLC slice paired with the lookup engine, another LLC slice that is accessible to the lookup engine, a memory within or accessible to the lookup engine that handles the query request, memory, or storage.

At 806, a key associated with the key address can be retrieved. The lookup engine that handles the query request can request the key from one or more of: an LLC slice paired with the lookup engine, another LLC slice that is accessible to the lookup engine, a memory within or accessible to the lookup engine, memory, or storage. Note that if a key is not available based on the key address, the process can end and provide a result of null.

At 808, a determination is made as to whether a hashed version of the retrieved key matches any signature in a bucket. Lookup engine can use a hardware-implemented hash engine to generate a hashed version of the retrieved key. Lookup engine can use one or more hardware-implemented comparison units to compare each hashed version of the retrieved key with a signature serially or in parallel. If there is a match, then action 810 follows. If there is no match, then action 820 follows whereby another bucket can be retrieved and the process continues at 808. However, if there is no additional bucket, the process can end and provide a result of null.

At 810, a key-pointer pair associated with the signature can be retrieved. For example, the lookup engine can retrieve the key-pointer pair from one or more of: an LLC slice paired with the lookup engine, another LLC slice that is accessible to the lookup engine, a memory within or accessible to the lookup engine, memory, or storage. At 812, the lookup engine can determine if the key in the key-pointer pair matches the retrieved key. For example, the lookup engine can use a hardware-implemented comparator to compare the retrieved key with the key in the key-pointer pair. If there is a match, then 814 follows. If there is no match, the process can end at 830 and a null result is provided to the query requester.

At 814, the data pointer from the key-pointer pair associated with the pair is provided as a result to the query requester. The data pointer can be provided in a result queue of the lookup engine. The data pointer can refer to a starting memory location of a data that is the result of the query instruction.

Figure 9:
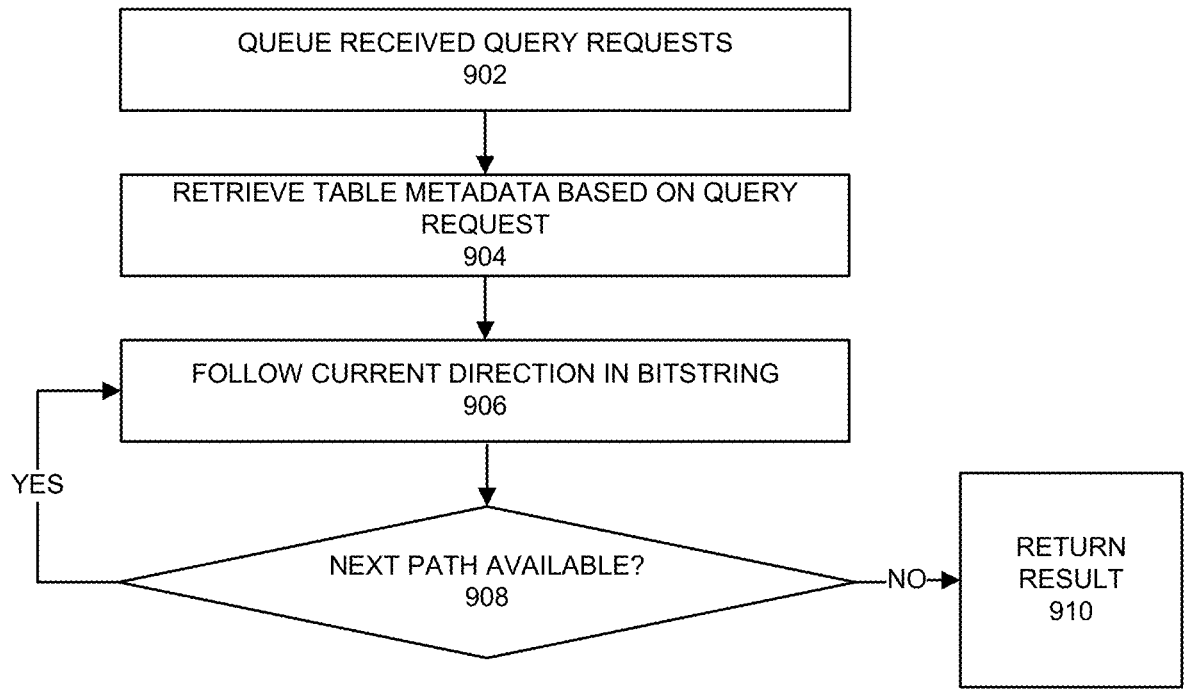
FIG. 9 depicts an example process that can be used to traverse a tree using a lookup engine.

FIG. 9 depicts an example process that can be used to traverse a tree using a lookup engine. During the process of FIG. 9, a scoreboard can be used to track the tree traversal, data retrieval, and comparisons and/or the scoreboard can be used to initiate operations such as lookups, mask operations, hash operations, or comparisons. At 902, a received query request is queued for execution. For example, the query request can be provided by a query dispatcher and received at a lookup engine. The query request can identify itself as associated with a tree traversal and provide a key address, table address, and result address. At 904, table metadata can be retrieved that indicates what kind of lookup-table is stored (e.g., one bucket per key or multiple buckets per key) and whether the table is tree or for hash-table lookup. At 906, the tree traversal direction in a key bitstring associated with the query instruction is taken. The key bitstring can be retrieved by requesting content starting at the key address. For example, if a current bit is a zero, a left branch can be taken; if a current bit is one, a right branch can be taken. The lookup engine can use a hardware-implemented mask to isolate a bit for use in providing direction. At 908, a determination is made if there is another bit in the bitstring to be followed. If there is another bit to interpret for tree traversal direction, action 906 follows. If there is not another bit to interpret for tree traversal direction, action 910 follows.

At 910, the content of the branch is compared against the key bitstring. If there is a match, then the corresponding data pointer is returned as a result by being placed in a result buffer or provided to the requester. If there is not a match, then a null result placed in a result buffer or provided to the requester.

Figure 10:
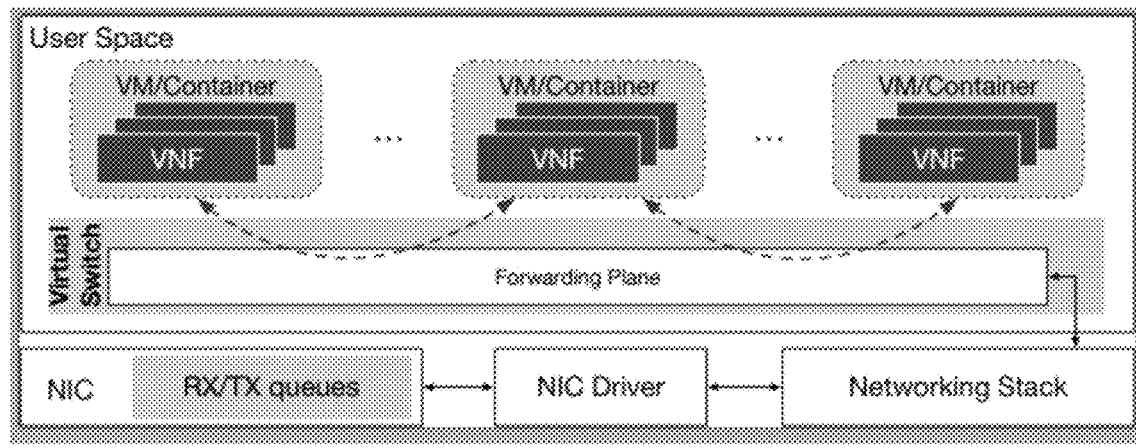
FIG. 10 provides an example of interactions with a virtual switch.

Various embodiments can be used in a variety of scenarios. For example, embodiments can be used in connection with Network Function Virtualization (NFV) in data centers. Together with software-defined networking (SDN) techniques, which decouple the data plane and the control plane of a networking platform, NFV is able to manage a large number of network traffic flows and allows the flexible and agile deployment of networking services on general purpose servers. As illustrated in FIG. 10, network services (e.g., virtual network functions (VNFs)), regardless of deployment methods (on shared platform or distributed platforms), communicate with each other through software virtual switches. For example, multiple VNFs employed by virtual machines (VMs) or containers can communicate with each other using a virtual switch. Performance analysis of virtual switches shows that the flow classification stage, especially the flow lookup operation, is a major bottleneck that limits the scalability of processing network packets in NFV, even though most of the relevant data can be cached in the last level cache (LLC) of servers with platform and software optimizations.

Virtual switches in NFV apply packet processing that involves querying match-action tables. As packets arrive, they are compared against the configured rules in multiple flow tables depending on their packet headers (e.g., TCP/IP, Ethernet, and so forth). Subsequently, the packets will be subject to corresponding actions derived from the matched rules. As this procedure is conducted at packet granularity, classifying each packet to its flow, is called flow classification.

Multi-tuple search can be implemented through multiple hash tables, where each hash table represents a tuple. Some embodiments can be used in connection with tuple space search described for example in the following paper: Venkatachary Srinivasan, Subhash Suri, and George Varghese. Packet Classification using Tuple Space Search. In Proceedings of the 1999 ACM SIGCOMM Conference (SIGCOMM'99), Cambridge, Mass., August 1999.

Figure 11:
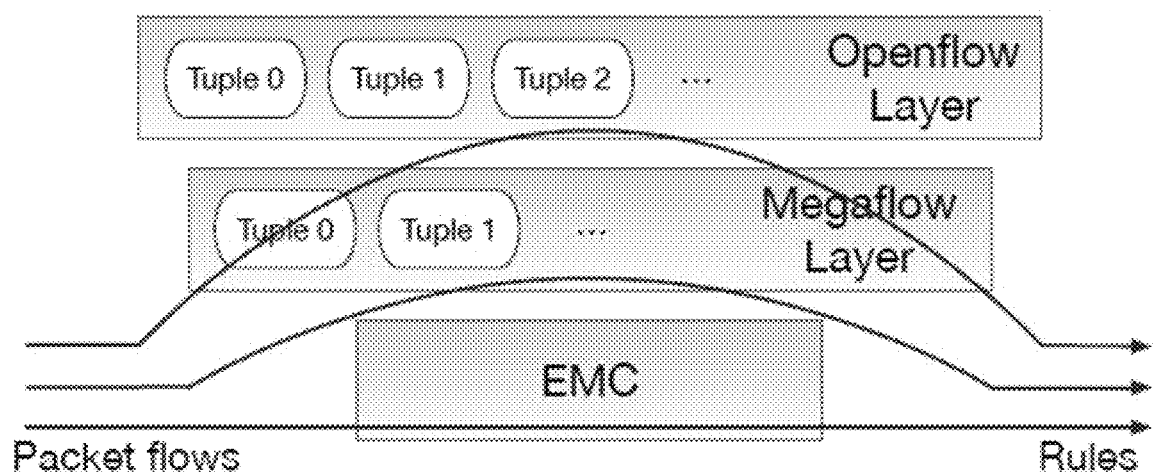
FIG. 11 depicts three layers of caches to cache flows and rules in a datapath.

FIG. 11 depicts three layers of caches to cache flows and rules in the datapath of Open vSwitch. Most of the packet flows will travel through the Exact Match Cache (EMC). If the rules are not found, the flows will be directed to Megaflow layer for tuple space search. Openflow layer is the last layer for rule lookups. EMC allows for recent flows to overwrite old flows and can be implemented with a hash table. The second layer, which is called Megaflow cache, is composed of a series of hash tables. Comparing to EMC, MegaFlow cache is capable of wildcard matching on packets. Packets arriving at the MegaFlow layer will undergo a sequential tuple space search. Each hash table in the tuple space search stores rules that share the same wildcarding pattern. The third layer, OpenFlow cache, is also used for tuple space search.

Figure 12:
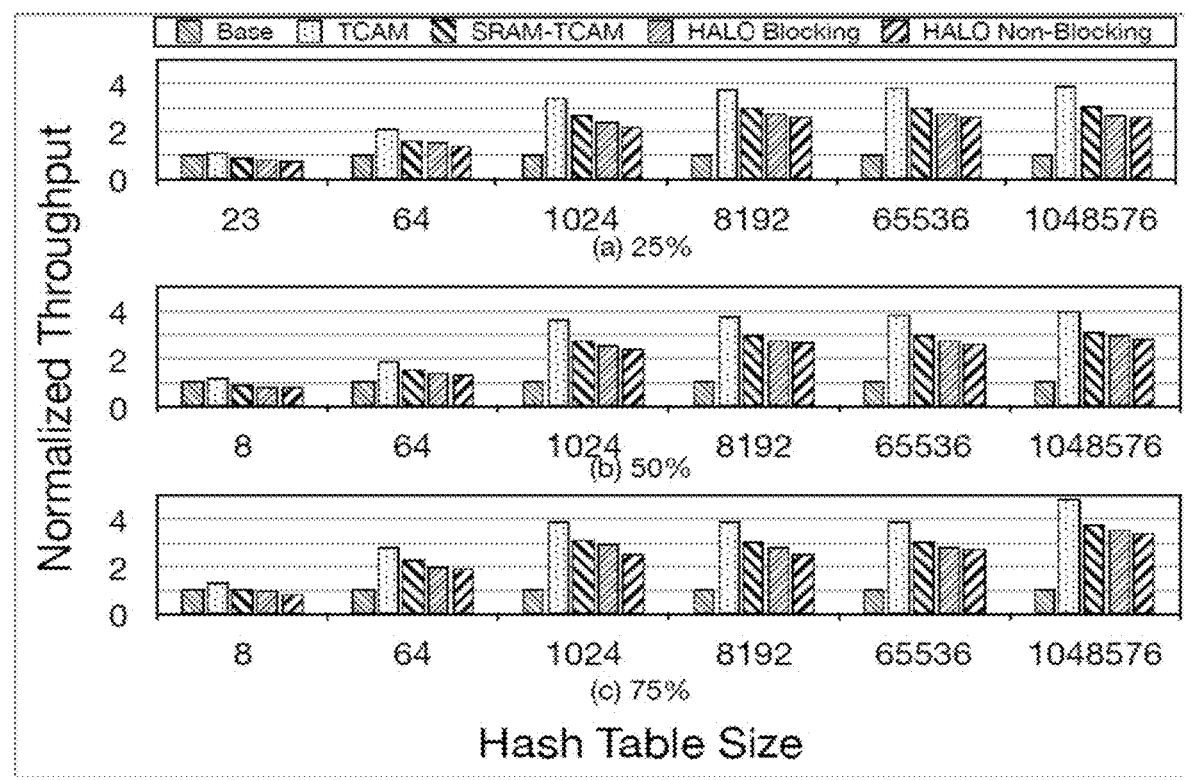
FIG. 12 depicts results of tests providing a comparison of results from searches using various approaches.
Figure 12:
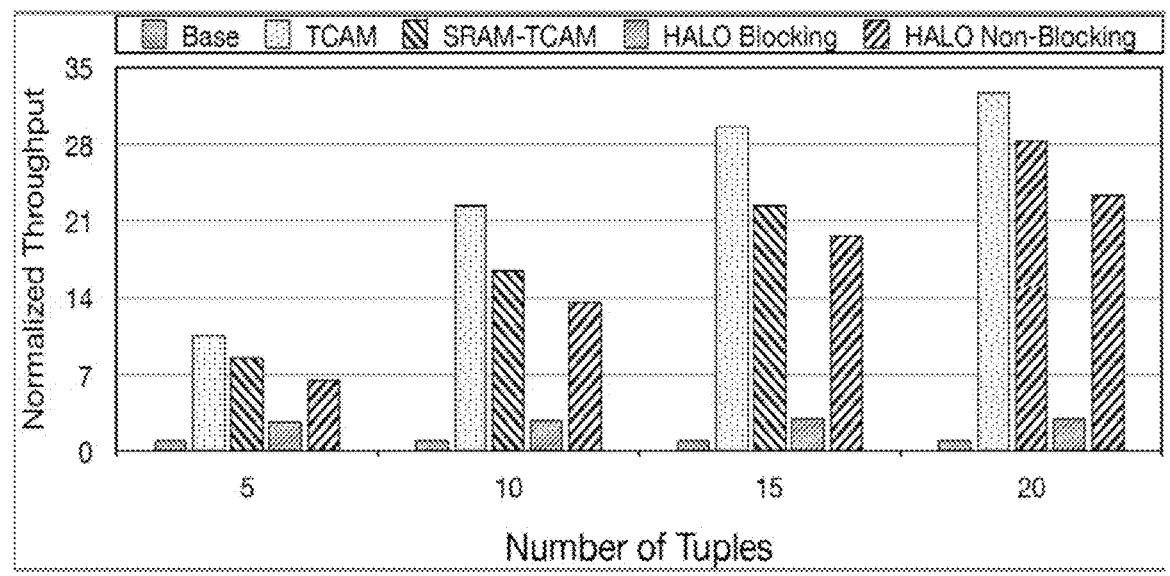

FIG. 12 depicts results of tests providing a comparison of results from search using TCAM, SRAM-based TCAM, blocking version of lookup engine commands, and non-blocking version of lookup engine commands for EMC-like flow classification with single hash table lookup. The results in FIG. 12 show that query offload to a lookup engine improves throughput by 3.3 times for hash table lookup over a software-executed lookup (i.e., a core executing a software to perform a lookup) and up to 23.4 times for tuple space throughput over a software-executed lookup, with negligible negative impact on the co-running network services. The lookup engine also performs up to 48.2 times more energy efficiently than a ternary content-addressable memory (TCAM) with trivial tile area overhead, which is not depicted.

Figure 13:
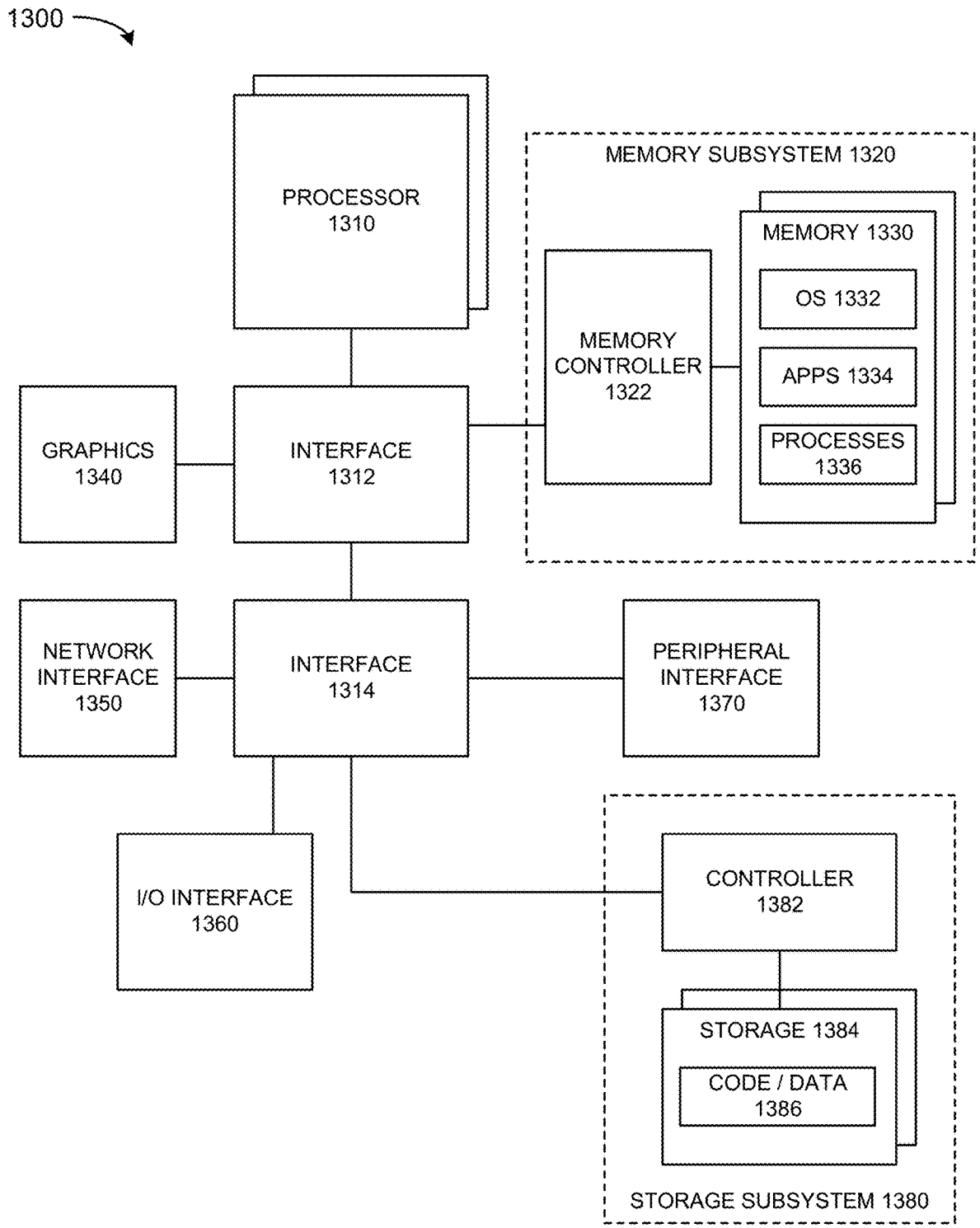
FIG. 13 depicts an example of a computing system.

FIG. 13 depicts an example of a computing system. System 1300 represents a computing device in accordance with any example herein, and can be a laptop computer, a desktop computer, a tablet computer, a server, group of servers, a gaming or entertainment control system, routing or switching device, embedded computing device, a smartphone, a wearable device, an internet-of-things device or other electronic device.

System 1300 includes processor 1310, which provides processing, operation management, and execution of instructions for system 1300. Processor 1310 can include any type of microprocessor, central processing unit (CPU), graphics processing unit (GPU), processing core, or other processing hardware to provide processing for system 1300, or a combination of processors. Processor 1310 controls the overall operation of system 1300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1300 includes interface 1312 coupled to processor 1310, which can represent a higher speed interface or a high throughput interface for system components that needs higher bandwidth connections, such as memory subsystem 1320 or graphics interface components 1340. Interface 1312 represents an interface circuit, which can be a standalone component or integrated onto a processor die. Where present, graphics interface 1340 interfaces to graphics components for providing a visual display to a user of system 1300. In one example, graphics interface 1340 can drive a high definition (HD) display that provides an output to a user. High definition can refer to a display having a pixel density of approximately 100 PPI (pixels per inch) or greater and can include formats such as full HD (e.g., 1380p), retina displays, 4K (ultra-high definition or UHD), or others. In one example, the display can include a touchscreen display. In one example, graphics interface 1340 generates a display based on data stored in memory 1330 or based on operations executed by processor 1310 or both. In one example, graphics interface 1340 generates a display based on data stored in memory 1330 or based on operations executed by processor 1310 or both.

Memory subsystem 1320 represents the main memory of system 1300 and provides storage for code to be executed by processor 1310, or data values to be used in executing a routine. Memory subsystem 1320 can include one or more memory devices 1330 such as read-only memory (ROM), flash memory, one or more varieties of random access memory (RAM) such as DRAM, or other memory devices, or a combination of such devices. Memory 1330 stores and hosts, among other things, operating system (OS) 1332 to provide a software platform for execution of instructions in system 1300. Additionally, applications 1334 can execute on the software platform of OS 1332 from memory 1330. Applications 1334 represent programs that have their own operational logic to perform execution of one or more functions. Processes 1336 represent agents or routines that provide auxiliary functions to OS 1332 or one or more applications 1334 or a combination. OS 1332, applications 1334, and processes 1336 provide software logic to provide functions for system 1300. In one example, memory subsystem 1320 includes memory controller 1322, which is a memory controller to generate and issue commands to memory 1330. It will be understood that memory controller 1322 could be a physical part of processor 1310 or a physical part of interface 1312. For example, memory controller 1322 can be an integrated memory controller, integrated onto a circuit with processor 1310.

While not specifically illustrated, it will be understood that system 1300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 1300 includes interface 1314, which can be coupled to interface 1312. In one example, interface 1314 represents an interface circuit, which can include standalone components and integrated circuitry. In one example, multiple user interface components or peripheral components, or both, couple to interface 1314. Network interface 1350 provides system 1300 the ability to communicate with remote devices (e.g., servers or other computing devices) over one or more networks. Network interface 1350 can include an Ethernet adapter, wireless interconnection components, cellular network interconnection components, USB (universal serial bus), or other wired or wireless standards-based or proprietary interfaces. Network interface 1350 can transmit data to a remote device, which can include sending data stored in memory. Network interface 1350 can receive data from a remote device, which can include storing received data into memory.

In one example, system 1300 includes one or more input/output (I/O) interface(s) 1360. I/O interface 1360 can include one or more interface components through which a user interacts with system 1300 (e.g., audio, alphanumeric, tactile/touch, or other interfacing). Peripheral interface 1370 can include any hardware interface not specifically mentioned above. Peripherals refer generally to devices that connect dependently to system 1300. A dependent connection is one where system 1300 provides the software platform or hardware platform or both on which operation executes, and with which a user interacts.

In one example, system 1300 includes storage subsystem 1380 to store data in a nonvolatile manner. In one example, in certain system implementations, at least certain components of storage 1380 can overlap with components of memory subsystem 1320. Storage subsystem 1380 includes storage device(s) 1384, which can be or include any conventional medium for storing large amounts of data in a nonvolatile manner, such as one or more magnetic, solid state, or optical based disks, or a combination. Storage 1384 holds code or instructions and data 1386 in a persistent state (i.e., the value is retained despite interruption of power to system 1300). Storage 1384 can be generically considered to be a "memory," although memory 1330 is typically the executing or operating memory to provide instructions to processor 1310. Whereas storage 1384 is nonvolatile, memory 1330 can include volatile memory (i.e., the value or state of the data is indeterminate if power is interrupted to system 1300). In one example, storage subsystem 1380 includes controller 1382 to interface with storage 1384. In one example controller 1382 is a physical part of interface 1314 or processor 1310 or can include circuits or logic in both processor 1310 and interface 1314.

A power source (not depicted) provides power to the components of system 1300. More specifically, power source typically interfaces to one or multiple power supplies in system 1300 to provide power to the components of system 1300. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Examples described herein can be applied to wired or wireless communication transmitters or transceivers. Examples can be used by or in connection with radio frequency (RF) transceiver components for accessing wireless voice and/or data networks (e.g., using cellular telephone technology, data network technology such as 3G, 4G/LTE, 5G, Wi Fi, other IEEE 802.11 family standards, or other mobile communication technologies, or any combination thereof), components for short range wireless communication (e.g., using Bluetooth and/or Bluetooth LE standards, NFC, etc.), and/or other components.

In an example, system 1300 can be implemented as sleds of processors, memories, storages, network interfaces, and other components interconnected using high speed interconnects such as optical interconnects.

Figure 14:
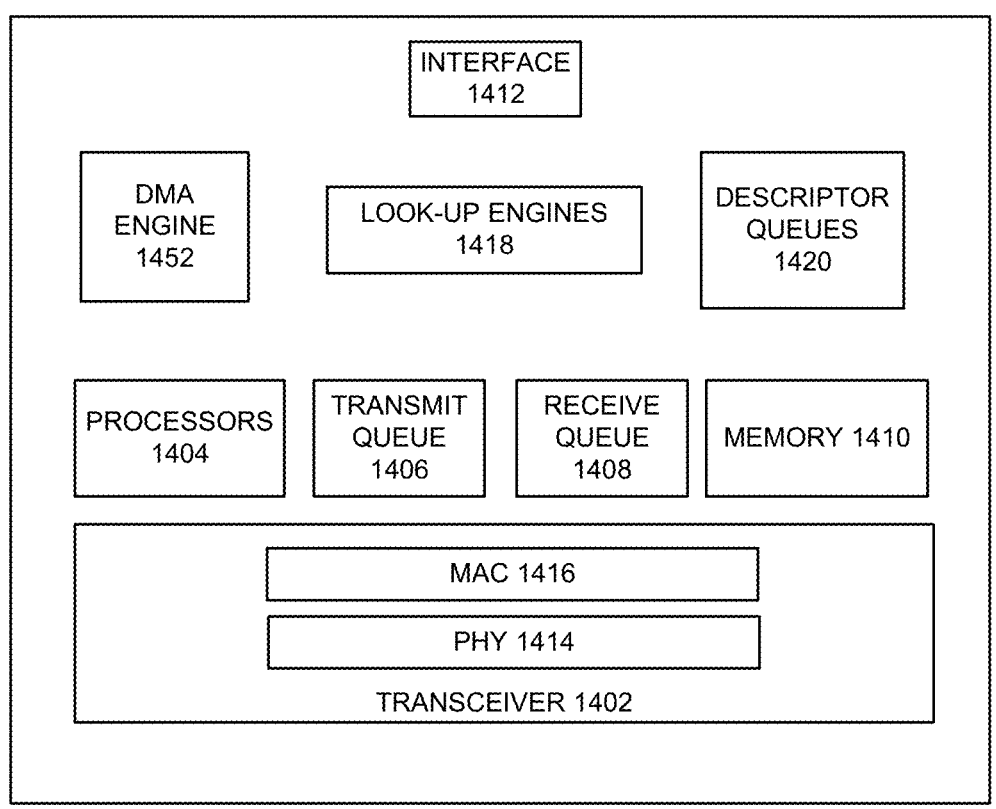
FIG. 14 depicts an example network interface.

FIG. 14 depicts an example network interface that can use embodiments. Network interface 1400 can include transceiver 1402, processors 1404, transmit queue 1406, receive queue 1408, memory 1410, and bus interface 1412, and DMA engine 1452. Transceiver 1402 can be capable of receiving and transmitting packets in conformance with the applicable protocols such as Ethernet as described in IEEE 802.3, although other protocols may be used. Transceiver 1402 can receive and transmit packets from and to a network via a network medium (not depicted). Transceiver 1402 can include PHY circuitry 1414 and media access control (MAC) circuitry 1416. PHY circuitry 1414 can include encoding and decoding circuitry (not shown) to encode and decode data packets. MAC circuitry 1416 can be configured to assemble data to be transmitted into packets, that include destination and source addresses along with network control information and error detection hash values. Processors 1404 can be any processor, core, graphics processing unit (GPU), or other programmable hardware device that allow programming of network interface 1400. For example, processors 1404 can utilize lookup engines 1418 described in various embodiments described herein for lookup operations in connection with packet processing. For example, packet processing can include one or more of: packet validation, ingress portion verification, egress port determination, egress queue determination, or any packet property determinations based on content or context of a received packet.

Memory 1410 can be any type of volatile or non-volatile memory device and can store any queue or instructions used to program network interface 1400. Transmit queue 1406 can include data or references to data for transmission by network interface. Receive queue 1408 can include data or references to data that was received by network interface from a network. Descriptor queues 1420 can include descriptors that reference data or packets in transmit queue 1406 or receive queue 1408. Bus interface 1412 can provide an interface with host device (not depicted). For example, bus interface 1412 can be compatible with PCI, PCI Express, PCI-x, Serial ATA, and/or USB compatible interface (although other interconnection standards may be used).

Direct memory access (DMA) engine 1452 can copy a packet header, packet payload, and/or descriptor directly from host memory to the network interface or vice versa, instead of copying the packet to an intermediate buffer at the host and then using another copy operation from the intermediate buffer to the destination buffer.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

What is claimed is:

1. An apparatus comprising:
   an interface and
   circuitry coupled to the interface, the circuitry to:
      receive a request for data from the interface;
      determine whether the data is associated with a data structure that comprises a hash-table or a tree data structure; and
      based on the determination that the data structure comprises the hash-table or the tree data structure, traverse the data structure to locate the data and provide a reference to the data based on use of one or more of: a mask unit, a hash unit, or a comparator unit, wherein based on the data structure comprising a hash-table, to traverse the data structure to locate the data and provide the reference to the data in response to the request for data, the circuitry is to:
         apply the hash unit to hash a key value associated with the request,
         apply the comparator unit to compare the hashed key value against a signature,
         apply the comparator unit to compare the key value against a key associated with the signature, and
         provide a data pointer based on a match between the key value and the key associated with the signature.

2. The apparatus of claim 1, wherein for a second request for data and based on the data structure comprising a tree data structure, to traverse the data structure in response to the second request for data, the circuitry is to:
   apply the mask unit to mask a portion of a key associated with the second request and to indicate a direction to traverse the tree data structure;
   apply the comparator unit to compare a key retrieved at an end node of the tree data structure with the key associated with the second request; and
   provide a data pointer based on a match between the key retrieved at the end node of the tree data structure with the key associated with the second request.

3. The apparatus of claim 1, further comprising a memory communicatively coupled to the circuitry, wherein the memory is to store contents of one or more cache lines and the memory comprises one or more of: a last level cache (LLC), a mid-level cache (MLC), or a volatile memory.

4. The apparatus of claim 3, wherein the memory is to store the key value associated with the request, a hash-table, and a key value-data array and wherein the circuitry is to access contents of the hash-table and the key value-data array.

5. The apparatus of claim 3, wherein the memory is to store the key value associated with the request and the tree data structure.

6. The apparatus of claim 1, wherein the circuitry is to record a progress of the request in a scoreboard.

7. The apparatus of claim 1, comprising a network interface, wherein the request for data is associated with a flow lookup for packet processing of at least one packet received by the network interface.

8. An apparatus comprising:
a plurality of lookup circuitries; and
circuitry to receive a request to perform a data lookup, from a core, and to select a lookup circuitry among the plurality of lookup circuitries to perform the received data lookup request, wherein the selected lookup circuitry is to perform the received data lookup request by:
cause a hash unit to hash a key value associated with the received data lookup request;
cause a comparator to compare the hashed key value against a signature;
cause the comparator to compare the key value against a key associated with the signature; and
provide a data pointer based on a match between the key value and the key associated with the signature.

9. The apparatus of claim 8, further comprising a memory communicatively coupled to the selected lookup circuitry, wherein the memory is to store contents of one or more cache lines and wherein the memory comprises one or more of: a last level cache (LLC) or a volatile memory.

10. The apparatus of claim 8, further comprising at least one core, wherein the at least one core comprises the core, and one or more of:
an interconnect communicatively coupled to the at least one core;
a host system communicatively coupled to the at least one core;
a storage communicatively coupled to the at least one core; or
a memory communicatively coupled to the at least one core.

11. The apparatus of claim 8, comprising a network interface, wherein the network interface comprises the circuitry to receive a request to perform the data lookup and to select the lookup circuitry among the plurality of lookup circuitries to perform the received data lookup request, wherein the request to perform the data lookup is associated with a flow lookup for packet processing of at least one packet received by the network interface.

12. The apparatus of claim 8, wherein the circuitry is to receive a second request to perform a data lookup and select a lookup circuitry among the plurality of lookup circuitries to perform the second received data lookup request and wherein the selected lookup circuitry is to perform the second received data lookup request by:
cause a mask unit to mask a portion of a key associated with the second request that indicates a direction to traverse a tree data structure;
cause a comparator to compare a key retrieved at an end node of the tree with the key associated with the second request; and
cause a data pointer based on a match between the key retrieved at the end node of the tree data structure with the key associated with the second request.

13. A non-transitory computer-readable medium, comprising instructions stored thereon, that if executed by one or more processors, cause the one or more processors to:
configure circuitry of a network interface to receive a data lookup request and to select a lookup circuitry among a plurality of lookup circuitries to perform the received data lookup request, wherein the selected lookup circuitry is to perform the received data lookup request by:
a hash unit hashing a key value associated with the request;
a comparator comparing the hashed key value against a signature;
the comparator comparing the key value against a key associated with the signature; and
providing a data pointer based on a match between the key value and the key associated with the signature.

14. The non-transitory computer-readable medium of claim 13, wherein the data lookup request is associated with flow classification for packet processing.

15. The non-transitory computer-readable medium of claim 13, comprising instructions stored thereon, that if executed by one or more processors, cause the one or more processors to:
based on receipt of a second request to perform a data lookup, select a lookup circuitry among the plurality of lookup circuitries to perform the second received data lookup request, wherein the selected lookup circuitry is to perform the second received data lookup request by:
a mask unit masking a portion of a key associated with the second request that indicates a direction to traverse a tree data structure;
a comparator comparing a key retrieved at an end node of the tree data structure with the key associated with the second request; and
providing a data pointer based on a match between the key retrieved at the end node of the tree with the key associated with the second request.

* * * * *